United States Patent
Yadav et al.

(10) Patent No.: US 12,204,419 B1
(45) Date of Patent: Jan. 21, 2025

(54) INTELLIGENT RESTORATION OF FILE SYSTEMS USING DESTINATION AWARE RESTORATIONS

(71) Applicant: Dell Products L.P., Round Rock, TX (US)

(72) Inventors: Sunil Yadav, Bangalore (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/478,132

(22) Filed: Sep. 29, 2023

(51) Int. Cl.
*G06F 11/14* (2006.01)

(52) U.S. Cl.
CPC ...... *G06F 11/1469* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 9,354,907 B1 | 5/2016 | Teli | |
| 9,424,136 B1 | 8/2016 | Teater et al. | |
| 9,569,446 B1 | 2/2017 | Feathergill et al. | |
| 10,310,949 B1 | 6/2019 | Chakraborty | |
| 10,387,381 B1 | 8/2019 | Patwardhan | |
| 10,417,099 B1 | 9/2019 | Yadav | |
| 11,042,450 B2 * | 6/2021 | Kang | G06F 11/1469 |
| 2014/0214899 A1 * | 7/2014 | Ganapathy | G06F 16/13 707/797 |
| 2015/0293817 A1 | 10/2015 | Subramanian | |
| 2016/0019317 A1 | 1/2016 | Pawar | |
| 2017/0185488 A1 | 6/2017 | Kumarasamy et al. | |
| 2022/0043717 A1 * | 2/2022 | Yadav | G06F 11/1458 |
| 2022/0342770 A1 | 10/2022 | Jagannatha | |
| 2022/0382641 A1 * | 12/2022 | Chopra | G06F 16/1748 |
| 2022/0398160 A1 * | 12/2022 | Zou | G06F 11/1435 |
| 2022/0398221 A1 * | 12/2022 | Zou | G06F 16/164 |
| 2023/0168970 A1 | 6/2023 | Pradhan | |
| 2023/0297477 A1 * | 9/2023 | Yadav | G06F 11/1451 714/15 |

* cited by examiner

*Primary Examiner* — Christopher J Raab
(74) *Attorney, Agent, or Firm* — Chamberlain, Hrdlicka, White, Williams & Aughtry; Aly Dossa

(57) ABSTRACT

Techniques described herein relate to a method for performing restorations of file system data on a host. The method may include identifying a restoration event associated with a file system of a host; obtaining backup metadata associated with a backup of the file system and obtaining current file system metadata associated with the file system; identifying non-matching files and matching files using the backup metadata and the current file system metadata; storing local copies of the matching files on the host; identifying, based on the current file system metadata and the backup metadata, matching portions, non-matching portions, and completely unique files; storing local copies of the matching portions of the non-matching files on the host to restore the matching portions of the non-matching files; and restoring the completely unique files of the non-matching files and the non-matching portions of the non-matching files from a backup storage.

20 Claims, 15 Drawing Sheets

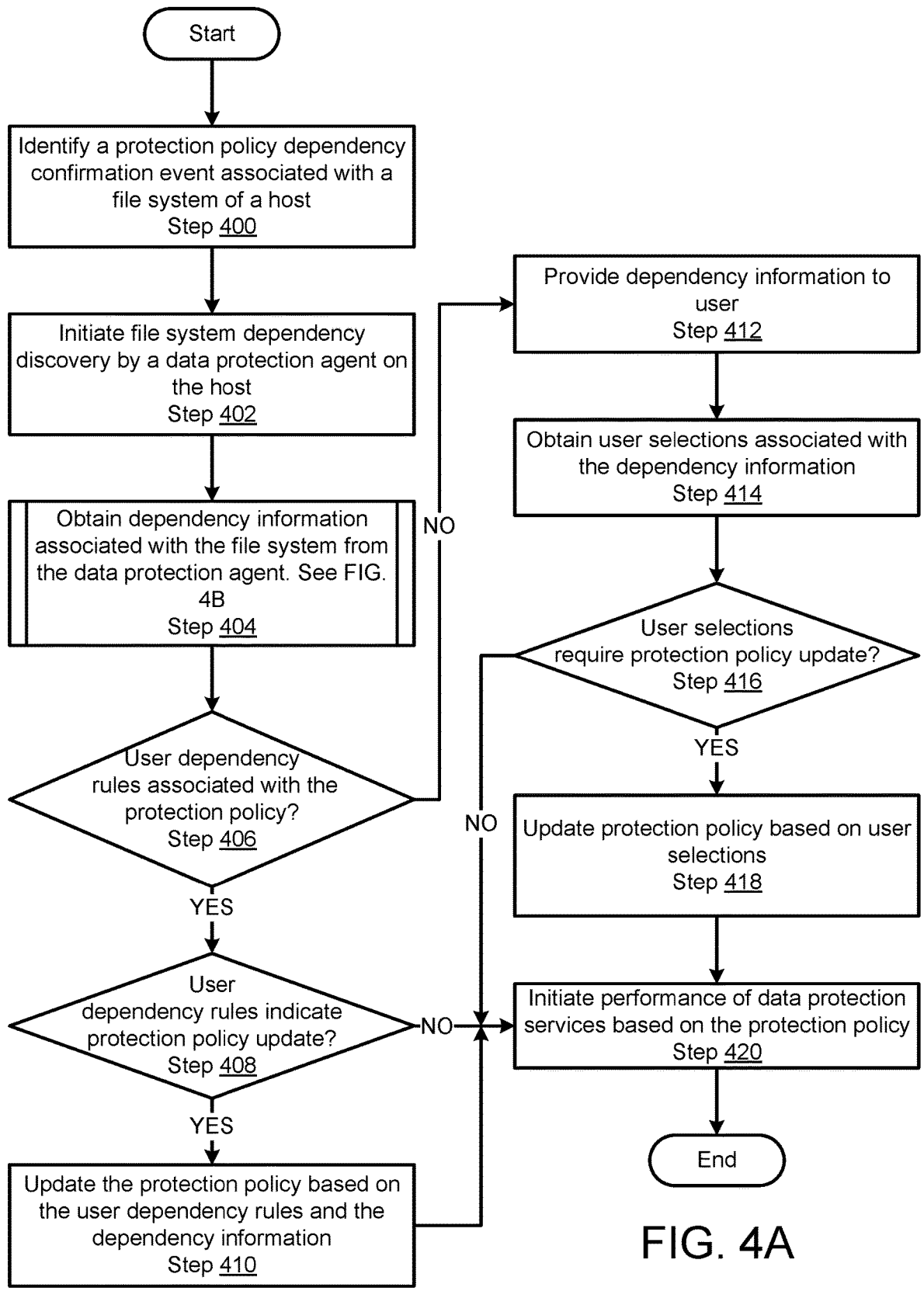

INTELLIGENT RESTORATION OF FILE SYSTEMS USING DESTINATION AWARE RESTORATIONS

BACKGROUND

Computing devices may provide services for users. To provide the services, the computing devices may generate data. The computing devices may provide and obtain data from other computing devices. The data may be important to the user. Data protection services may be performed to protect the data. The data protection services may include generating backups of data on one computing device and storing the backup on another computing device. The backup may be used to restore lost data.

SUMMARY

In general, in one aspect, the embodiments disclosed herein relate to a method performed to restore file system data on a host. The method includes identifying, by a data protection agent of a host, a restoration event associated with a file system of the host; in response to identifying the restoration event: obtaining backup metadata associated with a backup of the file system, wherein the backup metadata comprises previously generated checksums of the files included in the file system at a time the backup was generated; obtaining current file system metadata associated with the file system from a file system metadata repository on a storage of the host; generating current checksums of the files of the file system using the current file system metadata; identifying non-matching files and matching files using the previously generated checksums and the current checksums; storing local copies of the matching files on the host to restore the matching files; obtaining current data runs associated with the non-matching files from the current file system metadata; obtaining backup data runs associated with the non-matching files from the backup metadata; identifying, based on the current data runs and the backup data runs, matching portions of the non-matching files, non-matching portions of the non-matching files, and completely unique files of the non-matching files; storing local copies of the matching portions of the non-matching files on the host to restore the matching portions of the non-matching files; and restoring the completely unique files of the non-matching files and the non-matching portions of the non-matching files from a backup storage that includes the backup.

In general, in one aspect, the invention relates to a method performed to restore file system data on a host. The method includes identifying, by a data protection agent of a host, a restoration event associated with a file system of the host; in response to identifying the restoration event: obtaining backup metadata associated with a backup of the file system, wherein the backup metadata specifies data of files included in the file system at a time the backup was generated; obtaining current file system metadata associated with the file system from a file system metadata repository on a storage of the host; identifying non-matching files and matching files using the backup metadata and the current file system metadata; storing local copies of the matching files on the host to restore the matching files; identifying, based on the current file system metadata and the backup metadata, matching portions of the non-matching files, non-matching portions of the non-matching files, and completely unique files of the non-matching files; storing local copies of the matching portions of the non-matching files on the host to restore the matching portions of the non-matching files; and restoring the completely unique files of the non-matching files and the non-matching portions of the non-matching files from a backup storage that includes the backup.

In general, in one aspect, the invention relates to a non-transitory computer readable medium which includes computer readable program code, which when executed by a computer processor enables the computer processor to perform a method for restoring file system data on a host. The method includes identifying, by a data protection agent of a host, a restoration event associated with a file system of the host; in response to identifying the restoration event: obtaining backup metadata associated with a backup of the file system, wherein the backup metadata specifies data of files included in the file system at a time the backup was generated; obtaining current file system metadata associated with the file system from a file system metadata repository on a storage of the host; identifying non-matching files and matching files using the backup metadata and the current file system metadata; storing local copies of the matching files on the host to restore the matching files; identifying, based on the current file system metadata and the backup metadata, matching portions of the non-matching files, non-matching portions of the non-matching files, and completely unique files of the non-matching files; storing local copies of the matching portions of the non-matching files on the host to restore the matching portions of the non-matching files; and restoring the completely unique files of the non-matching files and the non-matching portions of the non-matching files from a backup storage that includes the backup.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 4A shows a flowchart of a method for performing protection policy confirmation in accordance with one or more embodiments disclosed herein.

DETAILED DESCRIPTION

Figure 1A:
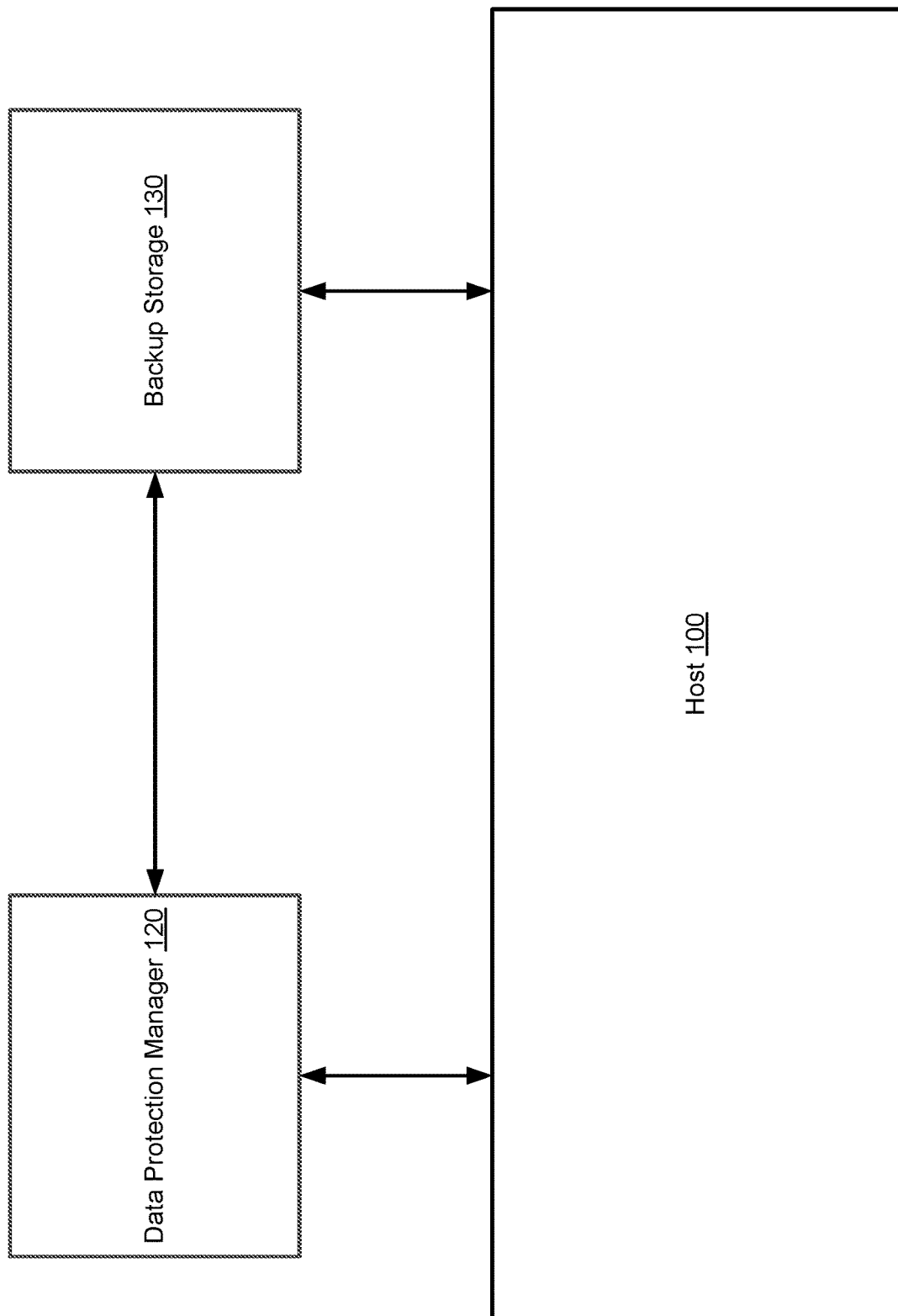
FIG. 1A shows a diagram of a system in accordance with one or more embodiments disclosed herein.

Specific embodiments will now be described with reference to the accompanying figures. In the following description, numerous details are set forth as examples of the embodiments disclosed herein. It will be understood by those skilled in the art that one or more embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to methods, systems, and non-transitory computer readable mediums for performing intelligent restorations.

When a file system is restored on a host from a backup storage target, the host, or a component thereof (e.g., a data protection agent) may copy all data from every file included in the file system from the backup target storage to the host itself. There may be scenarios in which the same data is copied over and over again from the backup target to the host. For example, many folders in a file system may include the same file with the same data. Upon restoration of all or a portion of the file system, the host may continuously copy the data of that file from the backup storage target to the host when the data of the file may currently reside on the host as a result of a previous restoration or already copying the data of the file during the current restoration. Redundant copying of data from the backup storage target to the host may waste time and storage space, network bandwidth, and/or other computing resources on the host, possibly hindering the performance of other computer implemented services by the host.

To address, at least in part, the aforementioned issues discussed above, embodiments disclosed herein relate to systems, methods, and/or non-transitory computer readable mediums that enable intelligent destination aware recovery of file systems. More specifically, embodiments disclosed herein may leverage the intelligent and rich backup metadata, destination metadata, and the native capabilities of the file system such as block cloning to perform restorations of file systems on hosts from backup storages. As a result, the time and computing resources required to perform the restorations may be minimized, improving the efficiency of performing file system restorations on hosts from backup storage targets.

FIG. 1A shows a diagram a system in accordance with one or more embodiments disclosed herein. The system may include a host (100), a data protection manager (120), and backup storages (130). The components of the system illustrated in FIG. 1A may be operatively connected to each other and/or operatively connected to other entities (not shown) via any combination of wired (e.g., Ethernet) and/or wireless networks (e.g., local area network, wide area network, Internet, etc.) without departing from embodiments disclosed herein. Each component of the system illustrated in FIG. 1A is discussed below.

In one or more embodiments, the host (100) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the host (100) described herein and/or all, or a portion, of the methods illustrated in FIGS. 2A-3B. The host (100) may be implemented using other types of computing devices without departing from the embodiments disclosed herein. For additional details regarding computing devices, refer to FIG. 4.

The host (100) may be implemented using logical devices without departing from the embodiments disclosed herein. For example, the host (100) may include virtual machines that utilize computing resources of any number of physical computing devices to provide the functionality of the host (100). The host (100) may be implemented using other types of logical devices without departing from the embodiments disclosed herein.

In one or more embodiments, the host (100) may include the functionality to, or otherwise be programmed or configured to, perform computer implemented services for users of the host (100). The cloud services may include electronic mail communication services, database services, calendar services, inferencing services, and/or word processing services. The computer implemented services may include other and/or additional types of services without departing from embodiments disclosed herein. The host (100) may also include the functionality to perform local data protection services. The local data protection services may include generating backups, generating backup metadata, providing backups to the backup storages (130), providing backup metadata to the data protection manager (120), and performing backup access services (also referred to as application instant access). The local data protection services may include other and/or additional services without departing from embodiments disclosed herein. The host (100) may include the functionality to perform all, or a portion of, the methods discussed in FIGS. 2A-3B. The host (100) may include other and/or additional functionalities without departing from embodiments disclosed herein. For additional information regarding the host, refer to FIG. 1B.

In one or more embodiments, the data protection manager (120) may be implemented using one or more computing devices. A computing device may be, for example, mobile phones, tablet computers, laptop computers, desktop computers, servers, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described herein and/or all, or a portion, of the methods illustrated in FIGS. 2A-3B. The data protection manager (120) may be implemented using other types of computing devices without departing from embodiments disclosed herein. For additional details regarding computing devices, refer to FIG. 4.

In one or more embodiments, the data protection manager (120) may be implemented using logical devices without departing from embodiments disclosed herein. For example, the data protection manager (120) may include virtual machines that utilize computing resources of any number of physical computing devices to provide the functionality of the data protection manager (120). The data protection manager (120) may be implemented using other types of logical devices without departing from the embodiments disclosed herein.

In one or more embodiments, the data protection manager (120) may include the functionality to, or may be otherwise programmed or configured to, perform data protection management services for the data generated on the host (100). The data protection management services may include: (i) initiating the performance of data protection services by a data protection agent (discussed below) executing on the host based on user requests and/or protection policies, (ii) maintaining backup metadata associated with backups, and (iii) generating and providing a user interface based on the backup metadata that provides users with an item level view of backups.

The data protection management services may include other and/or additional services without departing from embodiments disclosed herein. The data protection manager (120) may include the functionality to perform all, or a portion of, the methods of FIGS. 2A-3B. The data protection manager (120) may include other and/or additional functionalities without departing from embodiments disclosed herein. For additional information regarding the data protection manager (120), refer to FIG. 1C.

In one or more embodiments, the backup storages (130) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the backup storages (130) described herein and/or all, or a portion, of the methods illustrated in FIGS. 2A-3B. The backup storages (130) may be implemented using other types of computing devices without departing from the embodiments disclosed herein. For additional details regarding computing devices, refer to FIG. 4.

The backup storages (130) may be implemented using logical devices without departing from the embodiments disclosed herein. For example, the backup storages (130) may include virtual machines that utilize computing resources of any number of physical computing devices to provide the functionality of the backup storages (130). The backup storages (130) may be implemented using other types of logical devices without departing from the embodiments disclosed herein.

In one or more embodiments, the backup storages (130) may include the functionality to, or otherwise be programmed or configured to, obtain and store backups generated on the host (100). The backup storages (130) may also include the functionality to provide all, or a portion, of the backups stored on the backup storages (130) to the host (100) for item level recovery or item level access purposes. The backup storages (130) may include the functionality to perform all, or a portion of, the methods discussed in FIGS. 2A-3B. The backup storages (130) may include other and/or additional functionalities without departing from embodiments disclosed herein.

In one or more embodiments disclosed herein, the backup storages (130) may include one or more backup storages. The backup storages (130) may include any quantity of backup storages without departing from embodiments disclosed herein. In one or more embodiments, a backup storage of the backup storages (130) may include a backup storage type. The backup storages (130) may include any quantity and/or combination of backup storage types without departing from embodiments disclosed herein. Each backup storage type may be associated with a particular backup storage format or backup storage functionality. A backup storage type may include, a block-based backup storage, a file system-based backup storage, and/or an object-based backup storage. A block-based backup storages may store backups as one or more data blocks. A file system-based backup storage may store backups as one or more files and/or folders. An object-based backup storage may store backups as one or more objects. Other and/or additional types of backup storages may be included in the backup storages (130) without departing from embodiments disclosed herein.

Although the system of FIG. 1A is shown as having a certain number of components (e.g., 100, 120, 130), in other embodiments disclosed herein, the system may have more or fewer components. For example, the functionality of each component described above may be split across components or combined into a single component. Further still, each component may be utilized multiple times to carry out an iterative operation.

Figure 1B:
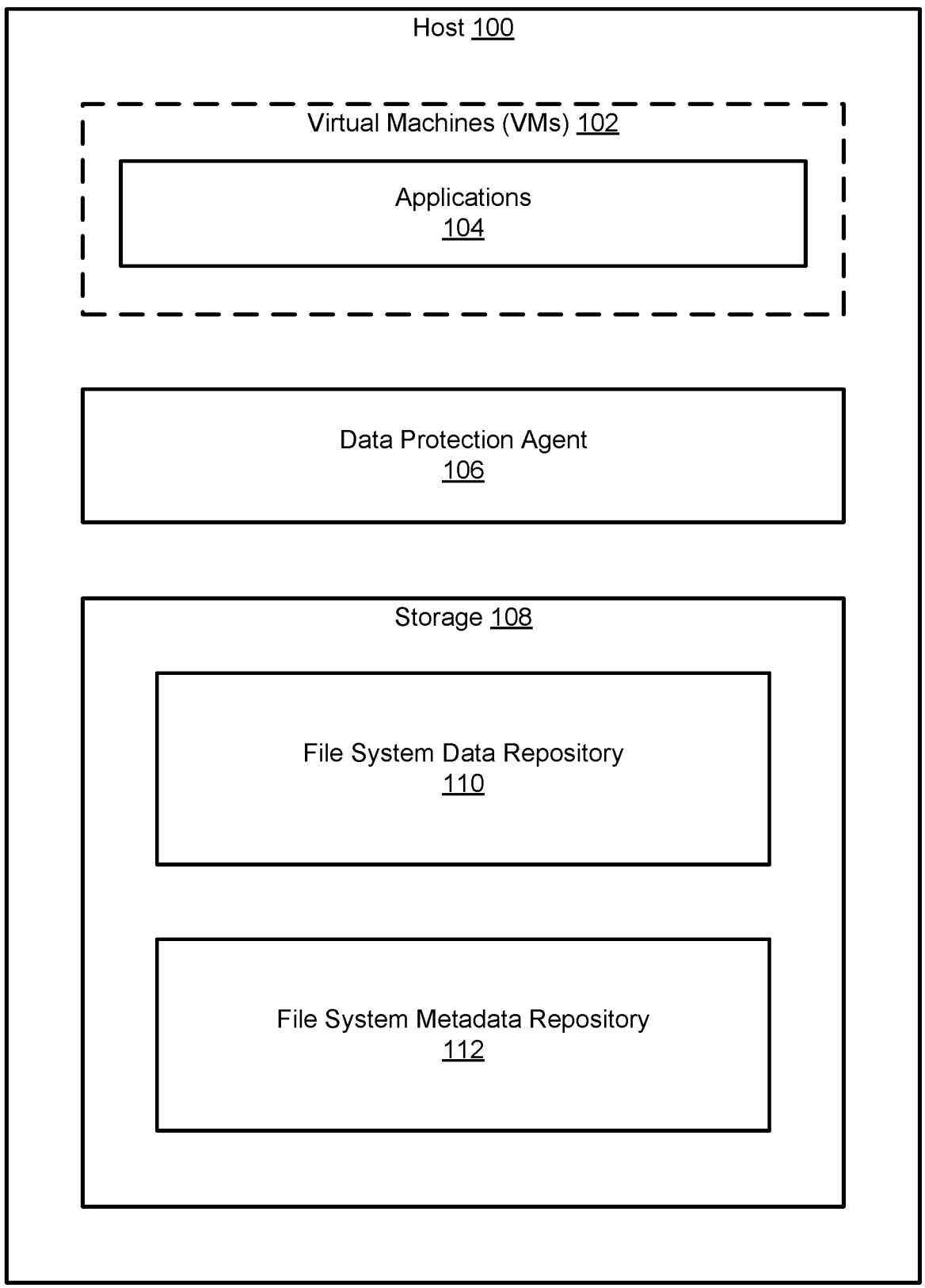
FIG. 1B shows a diagram of a host in accordance with one or more embodiments disclosed herein.

FIG. 1B shows a diagram of a host in accordance with one or more embodiments disclosed herein. The host (100) may be an embodiment of the host (100, FIG. 1A) discussed above. As discussed above, the host (100) may include the functionality to perform computer implemented services and local data protection services. To perform the aforementioned services, the host (100) may include a virtual machine (102), applications (104), a data protection agent (106), and storage (108). The host (100) may include other, additional, and/or fewer components without departing from embodiments disclosed herein. For example, the host may include multiple data protection agents if multiple applications require distinct backup generation functionalities. As yet another example, the host may include multiple virtual machines. Each of the aforementioned components of the host (100) is discussed below.

In one or more embodiments disclosed herein, the virtual machines (102) are implemented as computer instructions, e.g., computer code, stored on a storage (e.g., 108) that when executed by a processor of the host (100) causes the host (100) to provide the functionality of the virtual machine (102) described throughout this Detailed Description. The virtual machine may include the functionality to perform or otherwise provide computer implemented services to users. The virtual machine may include other and/or additional functionalities without departing from embodiments disclosed herein. The virtual machine may be managed by a hypervisor (e.g., computing instructions executing on the host (100)) (not shown). The hypervisor may be a Hyper-V hypervisor. The hypervisor may generate image backups (full and incremental) of VMs (102) executing on the host (100). The virtual machine (102) may include one or more applications (104). Each application may be a portion of the computer instructions discussed above, which when executed by a processor of the host (100), cause the host (100) to perform a portion of the computer implemented services performed by the virtual machine (102). For example, a database application may perform database services, a word processing application may perform word processing services, and an electronic mail communication application may perform electronic mail communication services, etc.

In one or more embodiments disclosed herein, the data protection agent (106) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the data protection agent (106) described throughout this Detailed Description.

In one or more embodiments disclosed herein, the data protection agent (106) is implemented as computer instructions, e.g., computer code, stored on a storage (e.g., 108) that when executed by a processor of the host (100) causes the host (100) to provide the functionality of the data protection agent (106) described throughout this Detailed Description.

In one or more embodiments disclosed herein, the data protection agent (106) is implemented using one or more external computing devices. Although such an implementation is not shown in the systems of FIG. 1A or FIG. 1B, the one or more computing devices may be operatively connected to the host (100) enabling the data protection manager to remotely interact with the host (100). For additional information regarding computing devices, refer to the discussion above with respect to FIG. 1A or the discussion below with respect to FIG. 4.

In one or more embodiments, the data protection agent (106) may include the functionality to perform the aforementioned local data protection services of the host (100). To perform the local data protection services, the data protection agent (106) may obtain requests and information from the data protection manager (120, FIG. 1A), and send and respond to commands between the backup storages (130, FIG. 1A) and the virtual machine (102) and the applications (104). The sending and responding to the commands may result in the performance of all, or a portion, of the methods discussed in FIGS. 2A-3B. The commands may be associated with an Internet Protocol, such as for example, Internet Small Computer Systems Interface (iSCSI). For additional information regarding the functionality of the data protection agent (106), refer to FIGS. 2A-3B.

In one or more embodiments, the storage (108) may be implemented using one or more volatile or non-volatile storages or any combination thereof. The storage (108) may include the functionality to, or otherwise be configured to, store and provide all, or portions, of information that may be used by the virtual machine (102), applications (104), and/or the data protection agent (106). The information stored in the storage (108) may include a file system data repository (110) and a file system metadata repository (112). The storage may include other and/or additional information without departing from embodiments disclosed herein. Each of the aforementioned types of information is discussed below.

In one or more embodiments disclosed herein, the applications (104) and/or users of the applications (104) generate data during the performance of computer implemented services. The data may be stored in a file system. In one or more embodiments disclosed herein, a file system is an organizational data structure that tracks how application data is stored and retrieved in a system (e.g., in storage (108) of the host (100), i.e., the file system data repository (110)). The file system may specify references to assets of applications and any asset data associated with each asset. An asset may be an individual data object in the file system. An asset may be, for example, a folder associated with an application(s) (e.g., 102). Each asset may include any number of elements. The elements may be, for example, subfolders and/or files associated with the application(s) (e.g., 102). Each file may include file data. The file data may include, for example, database data, calendar data, electronic mail communications data, etc.

In one or more embodiments, the file system data repository (110) may include one or more data structures that may be used to generate backups. The file system data repository (110) may include file data generated by the applications (104) and/or users of the applications (104) as discussed above. The file data may be any type of data such as database data and email data generated by users of the applications (104) without departing from the invention. Each application of the applications (104) may be associated with any number of assets (e.g., files, folders, etc.), each asset may include any quantity of file data, and furthermore, each asset may include any number of elements without departing from embodiments disclosed herein. Users and/or applications (104) may use the file data of the file system data repository (110) when obtaining computer implemented services from the host (100). Additionally, the file data of the file system data repository (110) may be obtained by the data protection agent (106) to generate backups. The file data of the file system data repository (110) may be used by other and/or additional entities for other and/or additional purposes without departing from embodiments disclosed herein. Additionally, the file system data repository (110) may include other and/or additional types of information without departing from embodiments disclosed herein.

In one or more embodiments, the file system metadata repository (112) may include one or more data structures that include information regarding files included in the file system stored in the file system data repository (110). The information may include, for example, an entry for each file that includes: file identifiers associated with the file, the file length or size, one or more data runs associated with one or more data blocks of the file, data block identifiers associated with the one or more data blocks of the file, the creation date, the modification date, the application identifier associated with the file, and a parent file or folder associated with the file. The file system metadata repository (112) may include other and/or additional information associated with the files stored in the file system data repository (110) without departing from embodiments disclosed herein. The file system metadata repository (112) may be used by the users of the applications (104) and/or the applications (104) during the performance of computer implemented services. The file system metadata repository (112) may be used by the data protection agent (106) to generate backup metadata (discussed below). The information included in the file system metadata repository (112) may be generated by the applications (104) and/or users of the applications (104) during the performance of computer implemented services and stored in the file system metadata repository (112).

While the data structures (e.g., 110, 112) and other data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (108), any of the aforementioned data structures may be stored in different locations (e.g., in storage of other computing devices) and/or spanned across any number of computing devices without departing from embodiments disclosed herein. The data structures discussed in this Detailed Description may be implemented using, for example, file systems, lists, linked lists, tables, unstructured data, databases, etc.

Figure 1C:
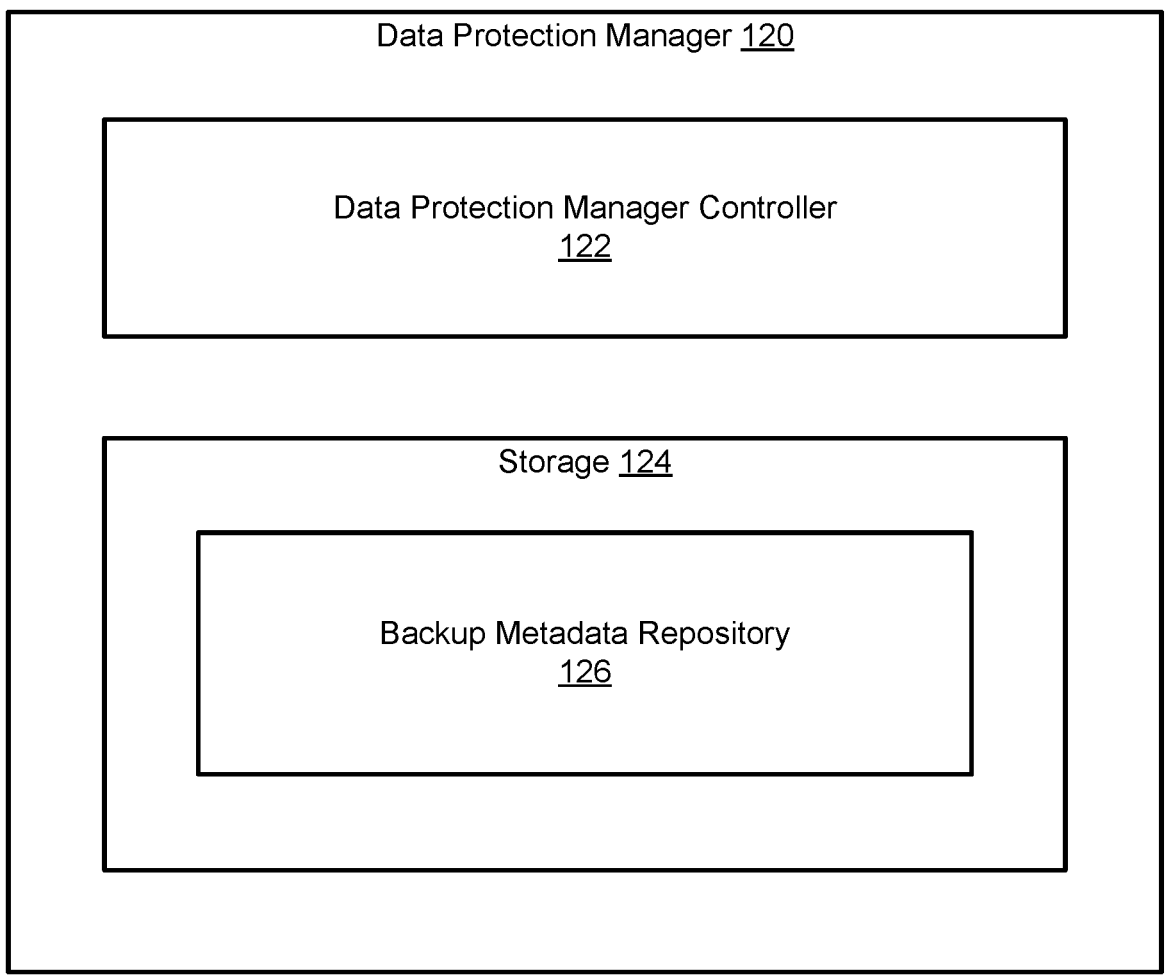
FIG. 1C shows a diagram of a data protection manager in accordance with one or more embodiments disclosed herein.

FIG. 1C shows a diagram of a data protection manager in accordance with one or more embodiments disclosed herein. The data protection manager (120) may be an embodiment of the data protection manager (120, FIG. 1A) discussed above. As discussed above, the data protection manager (120) may include the functionality to perform data protection management services. To perform the aforementioned services, the data protection manager (120) may include a data protection manager controller (122) and storage (124). The data protection manager (120) may include other, additional, and/or fewer components without departing from embodiments disclosed herein. Each of the aforementioned components of the data protection manager (120) is discussed below.

In one or more embodiments disclosed herein, the data protection manager controller (122) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the data protection manager controller (122) described throughout this Detailed Description.

In one or more embodiments disclosed herein, the data protection manager controller (122) is implemented as computer instructions, e.g., computer code, stored on a storage (e.g., 124) that when executed by a processor of the data protection manager (120) causes the data protection manager (120) to provide the functionality of the data protection manager controller (122) described throughout this Detailed Description.

In one or more embodiments, the data protection manager controller (122) may include the functionality to perform the aforementioned data protection management services. To perform the data protection management services, the data protection manager controller (122) may send requests and information to the data protection agent (106, FIG. 1B) to initiate the generation of backups and backup access services. The data protection manager controller (122) may perform all, or a portion, of the methods discussed in FIGS. 2A-3B. For additional information regarding the functionality of the data protection manager controller (122), refer to FIGS. 2A-3B.

In one or more embodiments, the storage (124) may be implemented using one or more volatile or non-volatile storages or any combination thereof. The storage (124) may include the functionality to, or otherwise be configured to, store and provide all, or portions, of information that may be used by users of the system and the data protection agent (106) to perform backup access services and/or other data protection services without departing from embodiments disclosed herein. The information stored in the storage (124) may include a backup metadata repository (126). The storage (124) may include other and/or additional information without departing from embodiments disclosed herein.

In one or more embodiments, the backup metadata repository (126) may include one or more data structures that include information regarding backups of the data generated on the host (100, FIG. 1A). The information may include, for example, for each backup, a backup identifier, a backup generation timestamp, and a storage location included in the backup storage. The information may also include, for each file in a backup: a file identifier associated with the file, a file name associated with the file, the file length or size, a checksum (discussed below), data runs, the application identifier associated with the file, and a parent file or folder associated with the file. The information may further include application information associated with the backups such as an application identifier, an application name, and an application type (e.g., database application, a word processing application, etc.).

The backup metadata repository (126) may include other and/or additional information associated with backups of the data generated on the host (100, FIG. 1A) without departing from embodiments disclosed herein. The backup metadata repository (126) may be used by the data protection agent (106, FIG. 1B) during the performance of backup access services. The information included in the backup metadata repository (126) may be generated by the data protection agent (106, FIG. 1B) during the backup generation and backup access services and stored in the backup metadata repository (126).

While the data structures (e.g., 126) and other data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (124), any of the aforementioned data structures may be stored in different locations (e.g., in storage of other computing devices) and/or spanned across any number of computing devices without departing from embodiments disclosed herein. The data structures discussed in this Detailed Description may be implemented using, for example, file systems, lists, linked lists, tables, unstructured data, databases, etc.

Figure 2A:
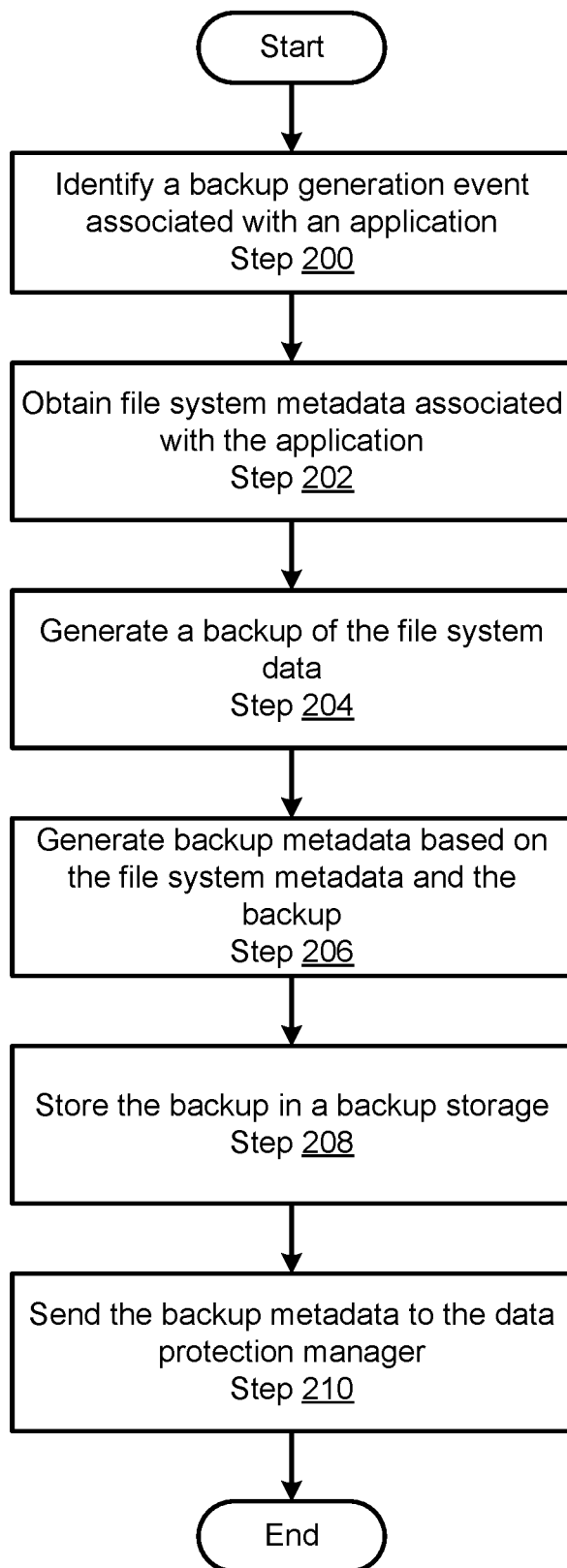
FIG. 2A shows a flowchart of a method for generating a backup in accordance with one or more embodiments disclosed herein.

FIG. 2A shows a flowchart of a method for generating a backup in accordance with one or more embodiments disclosed herein. The method shown in FIG. 2A may be performed by, for example, a data protection agent (e.g., 106, FIG. 1B). Other components of the system in FIGS. 1A-1C may perform all, or a portion, of the method of FIG. 2A without departing from the scope of the embodiments described herein. While FIG. 2A is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 200, a backup generation event associated with an application is identified. In one or more embodiments, the data protection agent may obtain a request to generate a backup from the data protection manager. The data protection agent may identify the receipt of the request as the backup generation event. The request may include the application identifier associated with the application targeted by the request. In one or more embodiments, the request may include a backup storage information associated with one or more backup storages in which the to-be generated backup is to be stored. The backup storage information may include the backup storage identifier, a backup storage type, and/or connection information (e.g., network address, IP address, etc.). The request may include other and/or additional information associated with backup generation without departing from embodiments disclosed herein. In one or more embodiments, the data protection manager may send the request based on a protection policy associated with an application or the file system. The protection policy may be a data structure that specifies backup requirements (e.g., a backup schedule specifying points in time to generate backups, backup storage information associated with one or more backup storages to store the backup and/or portions of the backup, etc.). The protection policies may be generated by users and provided to the data protection manager, which may monitor the protection policies to initiate the performance of data protection services according to the backup requirements specified by the protection policy.

In another embodiment, the data protection manager may send the backup generation request in response to an on-demand backup generation request submitted by a user of the system. The user may submit the on-demand backup generation request through any type of user interface (e.g., graphical user interface) without departing from embodiments disclosed herein. The on-demand backup generation request may include backup storage information associated with one or more backup storages to store the backup and/or portions of the backup and/or other information associated with the backup generation without departing from embodiments disclosed herein.

The backup generation event associated with an application may be identified via other and/or additional methods without departing from embodiments disclosed herein.

In Step 202, file system metadata associated with the application is obtained. As discussed above, the storage of the host may include file system metadata repository that stores information associated with files included in the file system of the host generated by user and/or applications of the host during the performance of computer implemented services. The data protection agent may obtain file system metadata associated with the application (for an application specific backup) or for the entirety of the file system (for a file system backup) from the file system metadata repository. The data protection agent may use the application identifier to obtain file system metadata associated with the application. The data protection agent may use other appropriate methods, frameworks, or techniques to obtain file system metadata and other information regarding applications of the host (e.g., a Volume Shadow Copy Service (VSS)). The file system metadata associated with the application may be obtained via other and/or additional methods without departing from embodiments disclosed herein.

In Step 204, a backup of the file system data is generated. In one or more embodiments, the data protection agent may use any appropriate technique to generate a backup of the file system (or files of the file system associated with an application) without departing from embodiments disclosed herein. For example, the data protection agent may generate, or initiate the generation of, a snapshot of the file system, where the snapshot of the file system is the backup of the file system or application. A backup of the file system data may be generated via other and/or additional methods without departing from embodiments disclosed herein.

In Step 206, backup metadata is generated based on the file system metadata and the backup. In one or more embodiments, the data protection agent may generate backup metadata based on the backup and the file system metadata. The data protection manager may generate and include checksums (discussed below) associated with the files included in the backup and include the checksums in the backup metadata. The data protection agent may generate a backup metadata file and include all, or a portion of the file system metadata in the backup metadata file. As a result, the backup metadata may include, for each file, a file identifier associated with the file, a file name associated with the file, the data runs associated with each file, the application identifier associated with the file, and a parent file or folder associated with the file. The backup metadata may include other and/or additional information without departing from embodiments disclosed herein.

In one or more embodiments, a data run may be associated with a data block of a file. Each file may include one or more data blocks. A data run may include an offset and data block extents. An offset may refer to one or more data structures that specify the distance from a reference point in a file system-based backup storage that includes the start of a file in the storage volume (e.g., virtual hard disk on the host or the backup storage). The distance may refer to the number of physical addresses or the quantity of data (e.g., bytes) between a reference point in the storage and the start of a file. The reference point may be a physical address that includes the first file of the backup or a base address in a storage. Since the backup may be stored according to the hierarchy of files included in the backup storage, the offset may be used to collect only a specifically requested file in the backup during backup access services. The offset may be derived from the backup itself or from the file system metadata (e.g., the parent file identifiers and the size or lengths of each file). The offset may include other and/or additional information without departing from embodiments disclosed herein.

In one or more embodiments, data block extents may refer to one or more data structures that specify where a data block and/or portions of data blocks of a block-based backup and file begin and end in the storage of the host and/or the backup storage. The data block extents may be obtained by the data protection agent based on the file system metadata and/or the backup. The data block extents may be pointers that reference locations in a backup storage where a data block or portion of a data block of a backup begins and ends. The data block extents may be used to identify and obtain specific data blocks of a block-based backup. Each data block extent of the data block extents may be associated with a data block or a portion of a data block of a backup. Each data block extent may be mapped to, or otherwise associated with, a file identifier of a file in the file system. The data block extents may include other and/or additional information and may be used for other and/or additional purposes without departing from embodiments disclosed herein.

The data protection agent may also include backup information in the backup metadata which may include an assigned backup identifier associated with the backup, a creation timestamp associated with the backup, and the targeted backup storage for the backup (e.g., as specified by the backup request obtained from the data protection manager). If more than one backup storage is used to store portions of the backup, the backup metadata file may be updated to include multiple instances of backup information associated with each backup storage. The backup metadata may be generated based on the file system metadata and the backup via other and/or additional methods without departing from embodiments disclosed herein.

In Step 208, the backup is stored in the backup storage. In one or more embodiments, the data protection agent sends the backup or the backup portion to the backup storage along with a request to store the backup or backup portion. In response to obtaining the backup and the request, the backup storage stores the backup in the backup storage. The backup may also include a copy of the backup metadata. The backup and the request may be provided to the backup storage using any appropriate method of data transmission without departing from embodiments disclosed herein. For example, the data protection agent may transmit the backup and the request as a message that includes one or more network packets through one or more network devices that operatively connect the data protection agent to the backup storage. The backup may be stored in the backup storage via other and/or additional methods without departing from embodiments disclosed herein.

In Step 210, the backup metadata is sent to the data protection manager. In one or more embodiments, the data protection agent sends the backup metadata to the data protection manager along with a request to store the backup metadata. In response to obtaining the backup metadata and the request, the data protection manager stores the backup metadata in the backup metadata repository. The backup metadata and the request may be provided to the data protection manager using any appropriate method of data transmission without departing from embodiments disclosed herein. For example, the data protection agent may transmit the backup metadata and the request as a message that includes one or more network packets through one or more network devices that operatively connect the data protection agent to the data protection manager. The backup metadata may be sent to the data protection manager via other and/or additional methods without departing from embodiments disclosed herein.

In one or more embodiments, the method ends following Step 210.

Figure 2B:
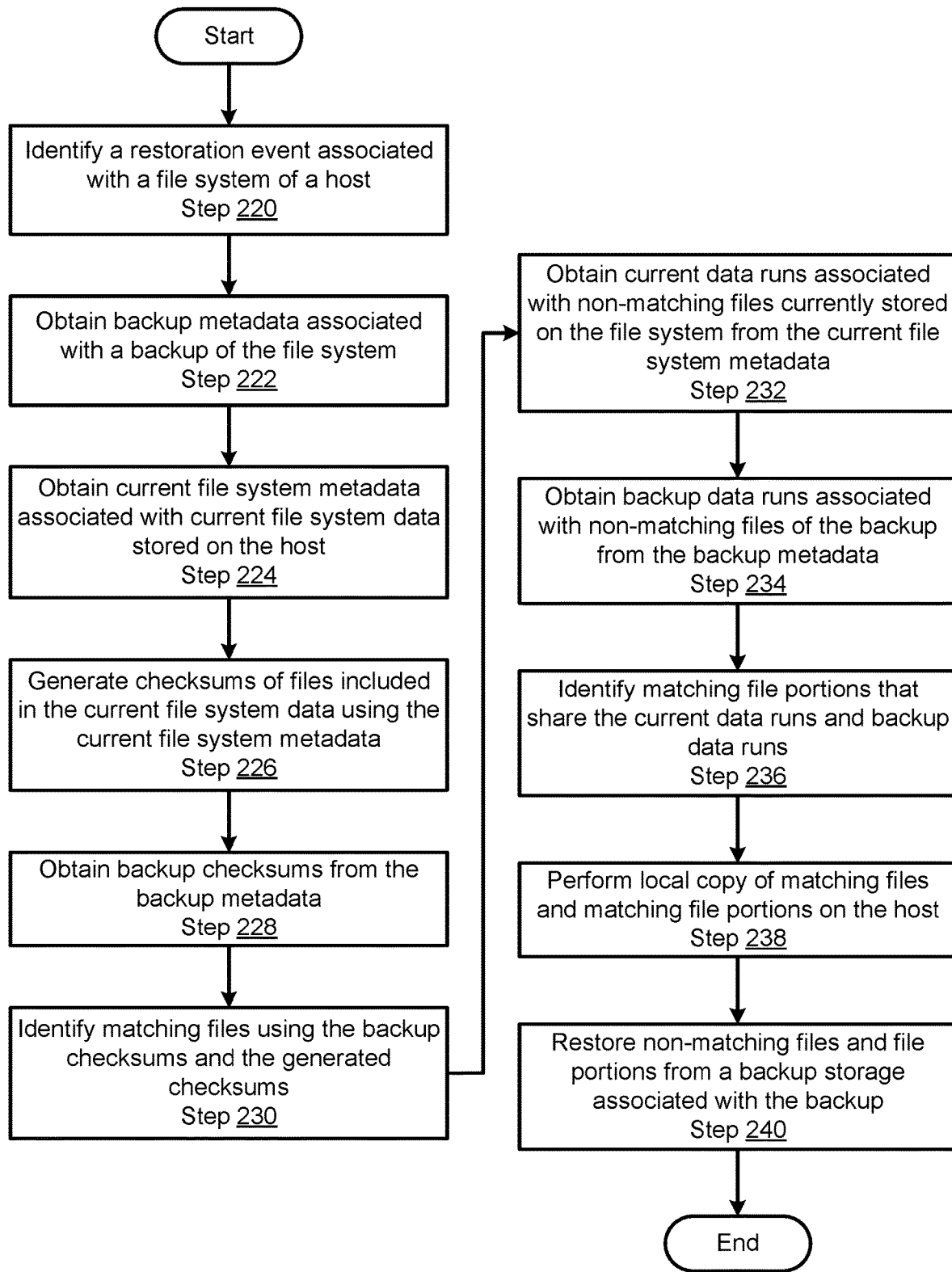
FIG. 2B shows a flowchart of a method for performing an intelligent restoration operation in accordance with one or more embodiments disclosed herein.

FIG. 2B shows a flowchart of a method for performing an intelligent restoration operation in accordance with one or more embodiments disclosed herein. The method shown in FIG. 2B may be performed by, for example, a data protection agent (e.g., 106, FIG. 1B). Other components of the system in FIGS. 1A-1C may perform all, or a portion, of the method of FIG. 2B without departing from the scope of the embodiments described herein. While FIG. 2B is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 220, a restoration event associated with a file system on a host is identified. In one or more embodiments, the data protection agent may obtain a request to restore an application on the host from the data protection manager. The data protection agent may identify the receipt of the request as the restoration event. The request may include the application identifier associated with the application targeted by the request. In one embodiment, the request may also include a backup identifier associated with the backup that the user desires to use to perform the restoration. Alternatively, in another embodiment, the data protection agent may just use the most recently generated backup associated with the application. In one or more embodiments, the request may include a backup storage information associated with one or more backup storages in which the most recent backup associated with the application is stored. The backup storage information may include the backup storage identifier, a backup storage type, and/or connection information (e.g., network address, IP address, etc.). The request may include other and/or additional information associated with backup generation without departing from embodiments disclosed herein.

In one or more embodiments, the data protection manager may send the restoration request in response to an on-demand restoration initiation request submitted by a user of the system. The user may submit the on-demand restoration initiation request through any type of user interface (e.g., graphical user interface) without departing from embodiments disclosed herein. The on-demand restoration initiation request may include backup storage information associated with one or more backup storages that include the most recent backup associated with the application and/or portions of the backup and/or other information associated with the restoration of the application without departing from embodiments disclosed herein.

In Step 222, backup metadata associated with a backup of the file system is obtained. In one or more embodiments, the data protection agent sends a request for the backup metadata associated with a backup associated with the application to the data protection manager. The request may include the application identifier associated with the application and/or a backup identifier associated with a backup corresponding to the application. In response to obtaining the request, the data protection manager obtains and sends the backup metadata associated with the most recent backup of the application or the backup specified by the backup identifier to the data protection agent. The backup metadata and the request may be provided to and from the data protection agent using any appropriate method of data transmission without departing from embodiments disclosed herein. For example, the data protection agent may transmit the request as a message that includes one or more network packets through one or more network devices that operatively connect the data protection agent to the data protection manager. Additionally, the data protection manager may transmit the backup metadata as a message that includes one or more network packets through one or more network devices that operatively connect the data protection agent and the data protection manager. The backup metadata associated with the backup may be obtained from the data protection manager via other and/or additional methods without departing from embodiments disclosed herein.

In Step 224, current file system metadata associated with the current file system data stored on the host is obtained. As discussed above, the storage of the host may include file system metadata repository that stores information associated with files included in the file system of the host generated by the user and/or applications of the host during the performance of computer implemented services. The current file system metadata may be associated with the current state of the file system. Said another way, the current file system metadata may be associated with current data stored in the file system on the host whereas the backup metadata may be associated with a backup of a previous state of the file system (or a portion of the file system associated with the application). The data protection agent may obtain current file system metadata associated with the application (for an application specific backup) or for the entirety of the file system (for a file system backup) from the file system metadata repository. The data protection agent may use the application identifier to obtain file system metadata associated with the application. The data protection manager may use other appropriate methods, frameworks, or techniques to obtain file system metadata and other information regarding applications of the host (e.g., a Volume Shadow Copy Service (VSS)). The current file system metadata associated with the application may be obtained via other and/or additional methods without departing from embodiments disclosed herein.

In Step 226, checksums of files included in the current file system data is generated using the current file system metadata. In one or more embodiments, the data protection agent may generate checksums of files included in the file system current file system associated with the application. The data protection agent may use the current file system metadata to identify the files of the file system associated with the application. The data protection agent may then use the data runs associated with each of the identified files to identify the data blocks associated with of the files. The data protection agent may then generate a checksum of each of the identified files using the data chunks corresponding to each of the identified files. The data protection agent may generate a checksum by applying any appropriate checksum generation technique to the data chunks without departing from embodiments disclosed herein. For example, the data protection may use Message Digest Algorithm 5 (MD5) and/or Secure Hash Algorithm (SHA) techniques such as SHA-1, SHA-256, and SHA-512. A checksum may refer to small-sized block of data derived from another block of digital data that may be used to efficiently check for changes in data blocks. If checksums match, then they were generated using the same data block that includes the same data. If the checksums do not match, then they were generated using different data blocks that include different data. The checksums of files included in the current file system data using the current file system metadata may be generated via other and/or additional methods without departing from embodiments disclosed herein.

In Step 228, backup checksums are obtained from the backup metadata. As discussed above, the backup metadata may include checksums associated with the files corresponding to the application. In one or more embodiments, the data protection agent may parse the backup metadata to obtain the backup checksums. The backup checksums may be obtained from the backup metadata via other and/or additional methods without departing from embodiments disclosed herein.

In Step 230, matching files are identified using the backup checksums and the generated checksums. In one or more embodiments disclosed herein, the data protection agent may compare the backup checksums associated with files included in the backup with the generated checksums associated with the files currently stored on the host to identify matching and non-matching files stored in the backup and currently stored on the host. As discussed above, a checksum may refer to small-sized block of data derived from another block of digital data that may be used to efficiently check for changes in data blocks. If a generated checksum matches a backup checksum, then they were generated using the same data blocks that includes the same data (referred to herein as a matching file). Accordingly, the corresponding file included in the backup matches the corresponding file stored in the host. If a generated checksums does not match a backup checksum, then they were generated using different data blocks that include different data (referred to herein as a non-matching file). Accordingly, the file associated with the checksums is new or has been modified since the previous backup was generated. In one or more embodiments, the data protection agent may identify the matching files that are included in the backup and currently on the host and the non-matching files included in the backup but not on the host. Matching files may be identified using the backup checksums and the generated checksums via other and/or additional methods without departing from embodiments disclosed herein.

In Step 232, current data runs associated with non-matching files currently stored on the file system are obtained from the file system metadata. As discussed above, each file currently stored on the host may be associated with one or more data runs as specified in the current file system metadata. In one or more embodiments, the data protection agent may parse the current file system metadata to obtain the current data runs associated with each non-matching file identified above in Step 230. The non-matching data file may include files associated with the application that are either: (i) present in the backup but not present currently on the host or (ii) are present on the backup but have been modified since the generation of the backup. The current data runs associated with the non-matching files currently stored on the file system may be obtained from the file system metadata via other and/or additional methods without departing from embodiments disclosed herein.

In Step 234, backup data runs associated with non-matching files of the backup are obtained from the backup metadata. As discussed above, the backup metadata may include checksums associated with the files corresponding to the application. In one or more embodiments, the data protection agent may parse the backup metadata to obtain the data runs of the backup associated with each non-matching file identified above in Step 230. The backup data runs may be obtained from the backup metadata via other and/or additional methods without departing from embodiments disclosed herein.

In Step 236, matching file portions that share current data runs and backup data runs are identified. In one or more embodiments, the data protection agent may compare the current data runs with the backup data runs to identify portions of non-matching files that match. The portion of the non-matching files that match may include a subset of the data blocks included in both the non-matching file on the backup and the corresponding non-matching file currently stored on the host. The current data runs and backup data runs of a data block of a non-matching file that include different data may be different. Alternatively, if current and backup data runs match, the corresponding data blocks in both the host and the backup may match. Additionally, to ensure the data blocks match, current data runs and the backup data runs may be used to compare the data blocks currently stored on the host with the corresponding data blocks in the backup storage to identify data blocks that match (i.e., are the same). This comparison may include generating data block checksums of the data blocks stored on the host and obtaining data block checksums of the data blocks on the backup storage and comparing the two checksums. The matching file portions of non-matching files that share current data runs and backup data runs may be identified via other and/or additional methods without departing from embodiments disclosed herein.

In Step 238, local copy of matching files and matching file portions is performed on the host. In one or more embodiments, the data protection agent may perform or initiate the local copy of matching files matching file portions (i.e., matching data blocks of non-matching files) from other locations in the host to a new location in the host to partially restore the application. In other embodiments, the data protection agent may initiate, by the file system (e.g., a Resilient File System (ReFS) file system) on the host, block cloning of all data blocks of the identified matching files and the matching file portions to perform a partial restoration of the application. A block cloning operation may include updating the physical storage to virtual storage mappings and a block cloning reference count to show that the files in the block cloning operation currently stored in the file system are now referenced by another file of the restored application without actually physically copying file data. Local copy of matching files and matching file portions may be performed on the host via other and/or additional methods without departing from embodiments disclosed herein.

In Step 240, non-matching files and file portions are restored from a backup storage associated with the backup. In one or more embodiments, the data protection agent may send a request for all data blocks associated with completely unique files and non-matching portions of non-matching files from the backup storage. The data protection agent may send a request to the backup storage that includes the backup for the data blocks associated with completely unique files and non-matching portions of non-matching files. The request may include the backup data runs associated with the completely unique files and non-matching portions of non-matching files. In response to obtaining the request, the backup storage may send the data blocks to the data protection agent. The data protection agent may then store the data blocks on the host to finish restoring the application. The request and the data blocks may be transmitted between the data protection agent and the backup storage using any appropriate method of data transmission without departing from embodiments disclosed herein. For example, the request and the data blocks may be transmitted a messages that include one or more network packets through one or more network devices that operatively connect the data protection agent to the data protection manager. Non-matching files and file portions may be restored from a backup storage associated with the backup via other and/or additional methods without departing from embodiments disclosed herein.

In one or more embodiments disclosed herein, the method ends following Step 240.

Figure 3A:
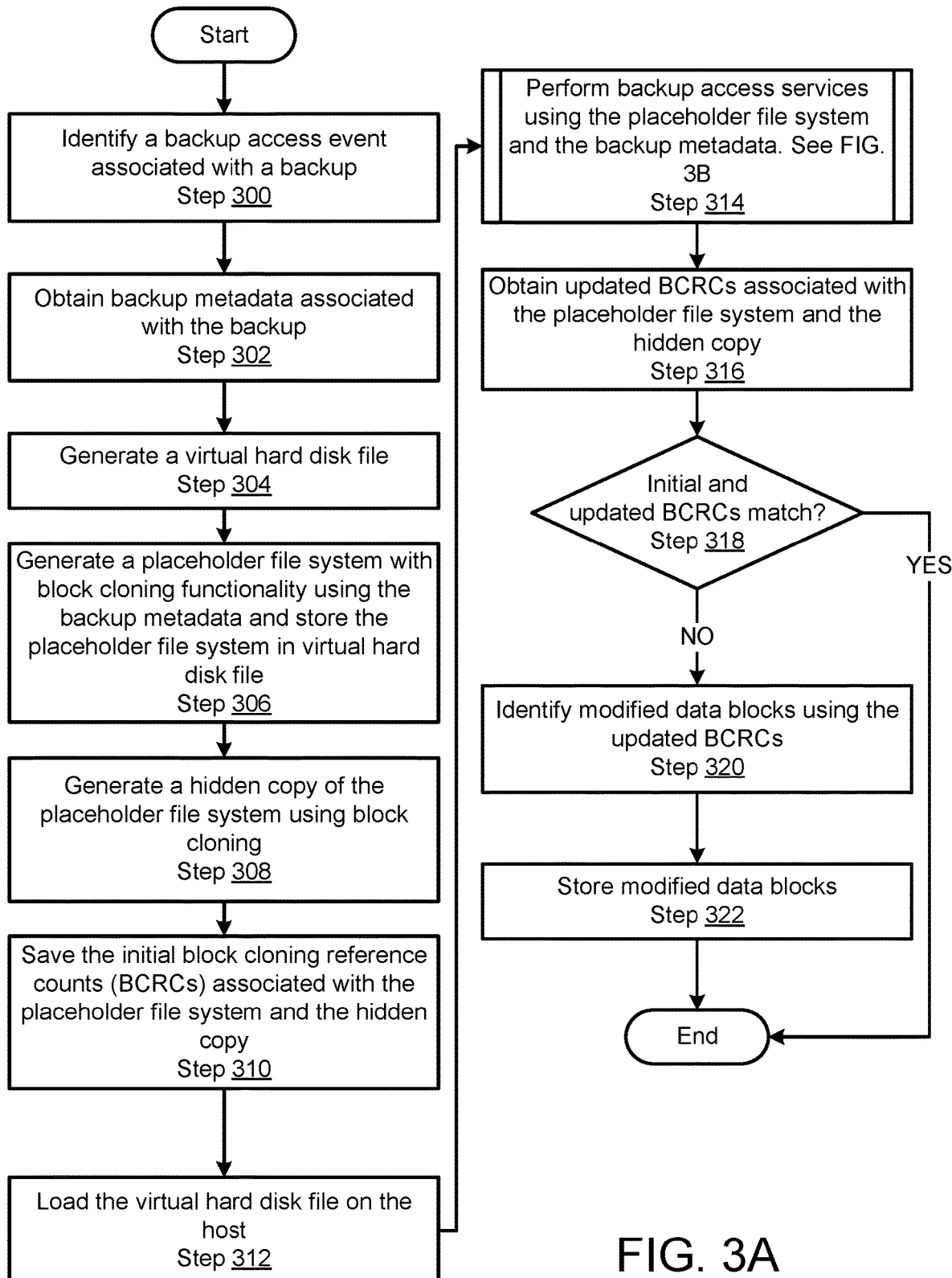
FIG. 3A shows a flowchart of a method for performing discovery during backup access services in accordance with one or more embodiments disclosed herein.

FIG. 3A shows a flowchart of a method for performing new data discovery during backup access services in accordance with one or more embodiments disclosed herein. The method shown in FIG. 3A may be performed by, for example, a data protection agent (e.g., 106, FIG. 1B). Other components of the system in FIGS. 1A-IC may perform all, or a portion, of the method of FIG. 3A without departing from the scope of the embodiments described herein. While FIG. 3A is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 300, a backup access event associated with a backup is identified. In one or more embodiments, the data protection agent may obtain a request to access a backup. The request may be from an application, directly from a user of the application, or from the data protection manager in response to a through a request obtained from a user through a user interface. The data protection agent may identify the receipt of the request as the backup access event. The request may include an application specific backup access request (i.e., a request to access a backup of files of the host file system associated with a particular application). In another embodiment, the request may include a file system backup access request (i.e., a request to access a backup of the entire file system of the host). The request may include the backup identifier associated with the backup targeted by the request. The request may include other and/or additional information associated with the backup without departing from embodiments disclosed herein. The backup access event associated with a backup may be identified via other and/or additional methods without departing from embodiments disclosed herein.

In Step 302, backup metadata associated with the backup is obtained. In one or more embodiments, the data protection agent sends a request for the backup metadata associated with the backup to the data protection manager. The request may include the backup identifier. In response to obtaining the request, the data protection manager obtains and sends the backup metadata to the data protection agent. The backup metadata and the request may be provided to and from the data protection agent using any appropriate method of data transmission without departing from embodiments disclosed herein. For example, the data protection agent may transmit the request as a message that includes one or more network packets through one or more network devices that operatively connect the data protection agent to the data protection manager. Additionally, the data protection manager may transmit the backup metadata as a message that includes one or more network packets through one or more network devices that operatively connect the data protection agent and the data protection manager. The backup metadata associated with the backup may be obtained from the data protection manager via other and/or additional methods without departing from embodiments disclosed herein.

In Step 304, a virtual hard disk file is generated. In one or more embodiments, the data protection agent generates a virtual hard disk file. The virtual hard disk file may be, for example, a virtual hard disk v2 (VHDX) file consistent with VHDX format. The virtual hard disk file may not include any data and/or metadata upon generation. The data protection agent may also mount the virtual hard disk file to the host. The virtual hard disk file may be generated via other and/or additional methods without departing from embodiments disclosed herein.

In Step 306, a placeholder file system with block cloning functionality is generated using the backup metadata and is stored in the virtual hard disk file. The data protection agent may generate the placeholder file system using the backup metadata and store the placeholder file system in the virtual hard disk file. The placeholder file system may include placeholder files arranged in the hierarchy specified in the backup metadata (e.g., via the parent file identifiers). The placeholder files may include the file identifiers associated with the corresponding file as specified by the backup metadata. The placeholder files may be set to include the length of the corresponding file as specified by the backup metadata. The placeholder files may include other information (e.g., file type, creation timestamps, corresponding application identifier, etc.) associated with the corresponding files in the backup without departing from embodiments disclosed herein. The placeholder files of the placeholder file system in the virtual hard disk file may not yet include actual file data.

In one or more embodiments, the data protection agent may obtain logical block addresses (LBAs) associated with each placeholder file in the placeholder file system stored in the virtual hard disk file. An LBA may refer to a block or other portion of virtual hard disk file where a placeholder file of the placeholder file system is stored or located. The data protection agent may generate a map of the LBAs and the corresponding placeholder files. The map may be any type of mapping without departing from embodiments disclosed herein. For example, the map may be a key value map where the LBA of a file is the key and the file name is the corresponding value. The LBA map may be included in the virtual hard disk file. The backup metadata may be updated to include a copy of the LBA map. The placeholder file system may be generated using the backup metadata and stored in the virtual hard disk file via other and/or additional methods without departing from embodiments disclosed herein.

In Step 308, a hidden copy of the placeholder file system is generated using block cloning. In one or more embodiments, the data protection agent may initiate the generation of the hidden copy of the placeholder file system by the placeholder file system performing block cloning on the files included in the placeholder file system. The placeholder file system may include a ReFS file system or some other type of file system with block cloning capabilities without departing from embodiments disclosed herein. A block cloning operation may include updating the physical storage (e.g., physical storage address) to virtual storage mappings (e.g., LBAs) and a block cloning reference count to show that the files of the placeholder file system in the block cloning operation currently stored in the placeholder file system are now referenced by the hidden copy of the placeholder file system without actually physically copying file data between the two file systems. In one or more embodiments disclosed herein, the application and other applications do not have access to the hidden copy. The applications may not know that the hidden copy exists. Alternatively, the data protection agent may access the hidden copy. The hidden copy of the placeholder file system may be generated using block cloning via other and/or additional methods without departing from embodiments disclosed herein.

In Step 310, initial block cloning reference counts (BCRCs) associated with the placeholder file system and the hidden copy are saved. As discussed above, the block cloning operation may include BCRCs. The BCRCs may be generated and updated by the placeholder file system during the performance of block cloning operations. The initial BCRCs may include a list of the files (e.g., the file identifiers associated with the files) in the placeholder file system and the amount of times the files are referenced by a file system. At this point in time, each file is referenced by at least the placeholder file system and the hidden copy. Thus the reference count associated with each file may be at least two. The initial BCRCs may also specify that both the placeholder file system and the hidden copy reference each file. In one or more embodiments, the data protection agent may obtain a copy of the initial BCRCs and save the initial BCRCs from the placeholder file system.

In Step 312, the virtual hard disk file is loaded on the host. In one or more embodiments, the data protection agent unmounts the virtual hard disk file. The data protection agent may launch, instantiate, initiate launch or otherwise initiate instantiation of an Internet Small Computer System Interface (ISCSI) target. The ISCSI target may be a software-based ISCSI target (e.g., computing instructions executed on the host, data protection agent, or the backup storage) or a hardware-based ISCSI target (e.g., a physical device including circuitry or a computing device such as a server) configured to receive and service ISCSI commands. The ISCSI target may be operatively connected to the backup storage(s) and the data protection agent. The ISCSI target may open, or otherwise access, the virtual hard disk file. The data protection agent may then launch or instantiate an ISCSI initiator. The ISCSI initiator may be a software-based ISCSI initiator (e.g., computing instructions executed on the host or the data protection agent) or a hardware-based ISCSI initiator (e.g., a physical device including circuitry or a computing device such as a server) configured to generate and send ISCSI commands. The ISCSI initiator may be operatively connected to the application. The data protection agent then establishes a connection between the ISCSI initiator and the ISCSI target such that the ISCSI initiator may send ISCSI commands to the ISCSI target, which may then service the commands and return the results to the ISCSI initiator.

The ISCSI target may load the virtual hard disk file and supply logical unit number (LUN) information to the ISCSI initiator. The LUN information may enable the initiator to present the virtual hard disk file as a volume to the single application instance of the VM. The virtual hard disk file may be loaded on the host via other and/or additional methods without departing from embodiments disclosed herein.

In Step 314, backup access services are performed using the placeholder file system and the backup metadata. In one or more embodiments, the backup access services may be performed via the method discussed below in FIG. 3B. The backup access services may be performed using the placeholder file system and the backup metadata via other and/or additional methods without departing from embodiments disclosed herein. For additional information regarding performing backup access services using the placeholder file system and the backup metadata, refer to FIG. 3B.

In Step 316, updated BCRCs associated with the placeholder file system and the hidden copy are obtained. In one or more embodiments, after the backup access by the application has ended, the data protection agent may obtain updated BCRCs from the placeholder file system. In one or more embodiments, during the backup access by the application, the placeholder file system may perform additional block cloning operations. If the application writes new data to the placeholder file system to generate a new file or modify an existing file, the placeholder file system may perform a copy-on-write to write the new data to a new unused physical address. If the write is associated with a new file, the placeholder file system may write the data blocks into one or more unused physical storage addresses and generate a new file associated with the new data blocks in the hidden copy of the placeholder file system. The placeholder file may update the reference count in the initial BCRCs associated with the new file to specify that the new file is referenced by the hidden copy.

If the write is modifying an existing file, the placeholder file system may merge the new data blocks with the existing data blocks of the file and store the merged data blocks into one or more unused physical storage addresses. The placeholder file system may generate a new file associated with the modified blocks in the hidden copy of the placeholder file system. The placeholder file system may update the reference count in the initial BCRCs to remove the reference of the hidden copy to the old file corresponding to the modified file. The placeholder file system may update the initial BCRCs to generate an updated BCRCs to reflect all new and modified files generated by the application throughout the backup access by the application. Updated BCRCs associated with the placeholder file system and the hidden copy may be obtained via other and/or additional methods without departing from embodiments disclosed herein.

In Step 318, a determination is made as to whether the initial and updated BCRCs match. In one or more embodiments, the data protection agent may compare the initial BCRC and the updated BCRC. In one or more embodiments, if the reference count associated with an old file on the updated BCRC is less than the reference count associated with the corresponding file in the initial BCRC (i.e., the hidden copy no longer references the old file but a newly generated modified file), then the data protection agent may determine that the initial and the updated BCRCs do not match. Additionally, in one or more embodiments, if the updated BCRC includes new files in the list of files that are not included in the initial BCRC (i.e., new files were generated during backup access), then the data protection agent may determine that the initial and the updated BCRCs do not match. In one or more embodiments, if the initial and updated BCRCs include the same list of files with the same reference counts (i.e., no new or modified files were generated during backup access), then the data protection agent may determine that the initial and updated BCRCs match. The determination as to whether the initial and updated BCRCs match may be made via other and/or additional methods without departing from embodiments disclosed herein.

In one or more embodiments disclosed herein, if it is determined that the initial and updated BCRCs match, then the method ends following Step 318. In one or more embodiments disclosed herein, if it is determined that the initial and updated BCRCs do not match, then the method proceeds to Step 320.

In Step 320, modified data blocks are identified using the updated BCRCs. In one or more embodiments, the data protection agent may identify the files in the updated BCRCs that are only referenced by the hidden copy. These file may include only new files or modified files that were newly generated during the backup access. In one or more embodiments, the updated BCRCs may include the storage locations (e.g., data runs, the physical addresses, pointers, logical to physical address mappings, etc.) associated with modified data blocks of newly generated files. The modified data blocks may include new data blocks of new files and merged data blocks associated of modified files. Alternatively, the hidden copy may include or otherwise generate storage locations associated with the modified data blocks of the newly generated files. The data protection manager may use the identified files and the corresponding storage locations to identify the modified data blocks.

In Step 322, the modified data blocks are stored. In one or more embodiments the modified data blocks are stored in storage (e.g., persistent storage) of the host. Accordingly, the modified data blocks may be used in subsequent backup access operations or subsequent backup generations associated with the application. Therefore, the modified data blocks may not be lost upon the conclusion of the backup access services.

In one or more embodiments disclosed herein, the method ends following Step 322.

Figure 3B:
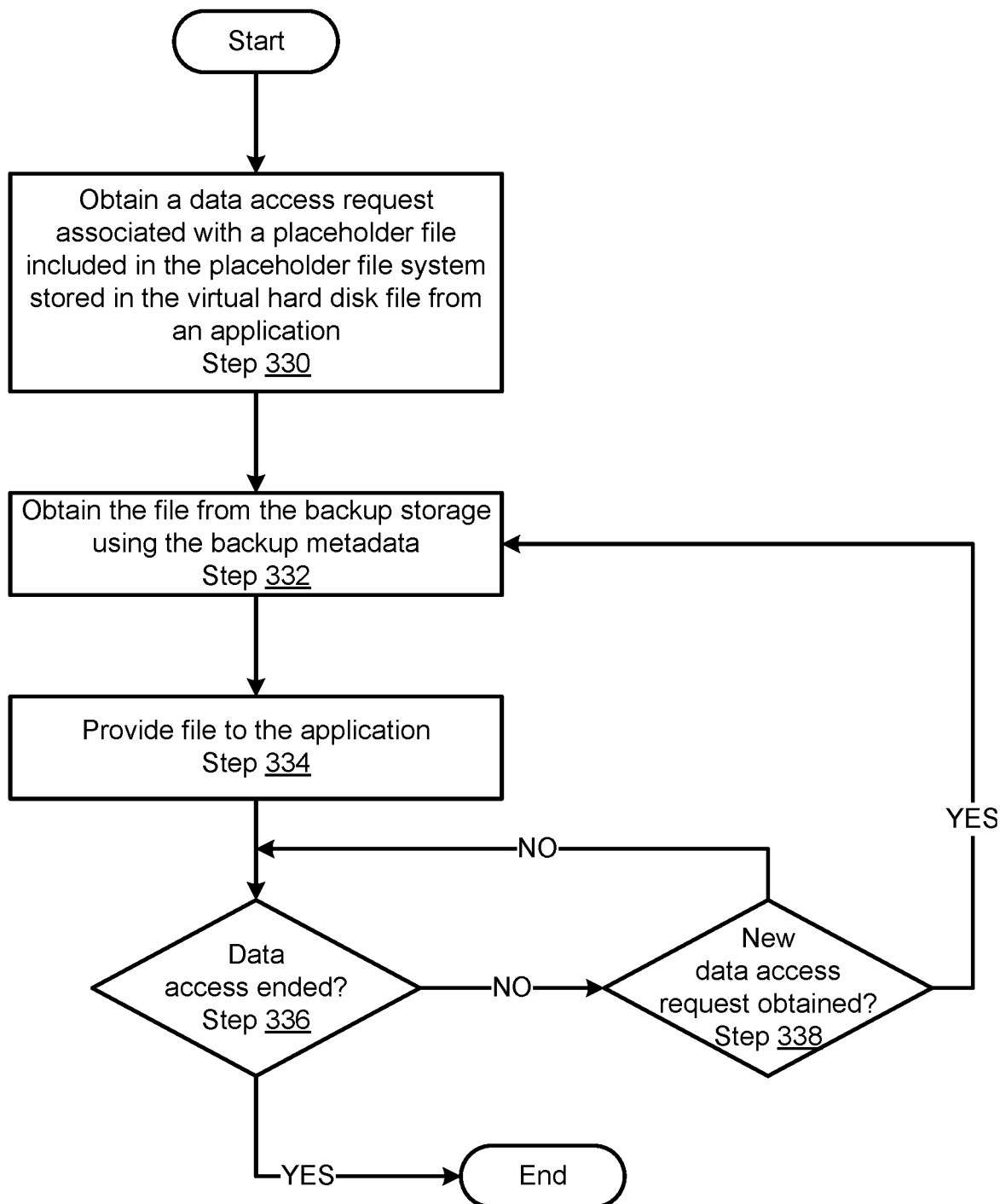
FIG. 3B shows a flowchart of a method for performing backup access services in accordance with one or more embodiments disclosed herein.

FIG. 3B shows a flowchart of a method for performing backup access services in accordance with one or more embodiments disclosed herein. The method shown in FIG. 3B may be performed by, for example, a data protection agent (e.g., 106, FIG. 1B). Other components of the system in FIGS. 1A-1C may perform all, or a portion, of the method of FIG. 3B without departing from the scope of the embodiments described herein. While FIG. 3B is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 330, a data access request associated with a placeholder file included in the placeholder file system stored in the virtual hard disk file is obtained from an application. In one or more embodiments, the application submits a data access request to the data protection agent. The data protection agent may then, through the ISCSI initiator, submit an ISCSI or small computer system interface (SCSI) command to read a placeholder file in the place holder file system stored in the virtual hard disk file ISCSI target. The read request and the resulting SCSI command may include the LBA and the file size associated with the file. The data access request associated with the file may be the ISCSI command. A data access request associated with a file in the placeholder file system stored on the virtual hard disk file may be obtained from the application via other and/or additional methods without departing from embodiments disclosed herein.

In Step 332, a file is obtained from the backup storage using the backup metadata. As discussed above, the LBA map may specify the file name (e.g., file identifier) associated with the placeholder file. Also as discussed above, the backup metadata may include one or more backup storage information portions that include a backup storage identifier and file identifiers corresponding to files included in a backup or backup portion stored on the backup storage. The data protection agent may match the file identifier included in the LBA map with a file identifier included in a backup storage information portion. The data protection agent may then identify the backup storage associated with the backup identifier included in the corresponding backup storage information portion as the backup storage associated with the placeholder file. The backup storage associated with the placeholder file may be identified via other and/or additional methods without departing from embodiments disclosed herein.

In Step 334, the file is provided to the application. In one or more embodiments, the ISCSI target may not be able to directly obtain the file data using the LBA since the LBA is associated with the virtual hard disk file and not the backup or backup portion stored in the backup storage. Accordingly, the ISCSI target uses the LBA map included in the backup metadata to identify the file corresponding to the placeholder file is associated with the SCSI command as discussed above. As discussed above, the LBA map may include a key value map that specifies LBAs and the corresponding file names or file identifiers. The ISCSI target may match the LBA in the SCSI command with an LBA in the LBA map and identify the corresponding file name. The ISCSI may then use the backup information portion associated with the file to identify the storage location of the file in the backup stored in the backup storage.

In one or more embodiments, if the backup storage is a file system-based backup storage, then the data protection agent may use the offset associated with the file corresponding to the file name in the backup storage information portion. The ISCSI target may then use the offset and a connection (e.g., network connection) to the backup storage to read the file data corresponding to the file from the backup storage and return the file data ISCSI initiator to service the SCSI command.

In one or more embodiments, if the backup storage is a block-based backup storage, then the data protection agent may use the data block extents associated with the file corresponding to the file name in the backup storage information portion. The ISCSI target may then use the data block extents and a connection (e.g., network connection) to the backup storage to read the file data corresponding to the file from the backup storage and return the file data ISCSI initiator to service the SCSI command.

The file may be obtained from the backup storage via other and/or additional methods without departing from embodiments disclosed herein.

In Step 336, a determination is made as to whether the backup access services have ended. In one or more embodiments, the application may send a notification indicating termination of the backup access services. Alternatively, the data protection agent may monitor or initiate monitoring of, by another entity not shown in FIGS. 1A-1C, the execution of the application. The data protection agent may know when the application stops executing thereby ending backup access services. The data protection agent may wait for the notification or the application to stop executing. In one or more embodiments, if the data protection agent obtains the notification or identifies the application has stopped executing, then the data protection agent may determine that the backup access services have ended. In one or more embodiments, if the data protection agent does not obtain the notification and does not identify that the application has stopped executing, then the data protection agent may determine that the backup access services have not ended. The determination as to whether the backup access services may be made via other and/or additional methods without departing from embodiments disclosed herein.

In one or more embodiments disclosed herein, if it is determined that the backup access services have ended, then the method ends following Step 336. In one or more embodiments disclosed herein, if it is determined that the backup access services have not ended, then the method proceeds to Step 336.

In Step 338, a determination is made as to whether a new data access request is obtained. In one or more embodiments, the data protection agent may check to determine if another data access request is obtained from the application. The data protection agent may obtain the data access request via the methods discussed above in Step 330. In one or more embodiments, if the data protection agent has not obtained a data access request after the previous data access request was obtained, then the data protection agent may determine that a new data access request was not obtained. In one or more embodiments, if the data protection agent has obtained a data access request after the previous data access request was obtained, then the data protection agent may determine that a new data access request is obtained. The determination as to whether a new data access request is obtained may be made via other and/or additional methods without departing from embodiments disclosed herein.

In one or more embodiments disclosed herein, if it is determined that a new data access request is obtained, then the method proceeds to Step 332. In one or more embodiments disclosed herein, if it is determined that a new data access request is not obtained, then the method proceeds to Step 336.

FIG. 4A shows a flowchart of a method for performing application aware item level backup access services in accordance with one or more embodiments disclosed herein. The method shown in FIG. 4A may be performed by, for example, a data protection manager (e.g., 120, FIG. 1A). Other components of the system in FIGS. 1A-1C may perform all, or a portion, of the method of FIG. 4A without departing from the scope of the embodiments described herein. While FIG. 4A is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 400, a protection policy dependency confirmation event associated with a file system of a host is obtained. In one or more embodiments, the data protection manager may obtain a request to perform protection policy dependency confirmation on a file system of a host from a user. The request may be provided directly by a user through a user interface (e.g., a graphical user interface, a command-line interface, etc.) or indirectly through a client (not shown in the system of FIG. 1A) used by the user. The data protection manager may identify the receipt of the request as the protection policy dependency confirmation event. The request may include a protection policy associated with the file system or a protection policy identifier corresponding to the protection associated with the file system. The request may include other and/or additional information associated with protection policy dependency confirmation event without departing from embodiments disclosed herein.

In other embodiments, the data protection manager may monitor previously stored protection policies (not discussed above in FIGS. 1A-1C) associated with the file systems on the host. A protection policy may be a data structure that specifies backup requirements (e.g., a backup schedule specifying points in time to generate backups, backup storage information associated with one or more backup storages to store the backup and/or portions of the backup, etc.). The protection policies may be associated with a file system. The protection policies may be generated by users and provided to the data protection manager, which may monitor the protection policies to initiate the performance of data protection services according to the backup requirements specified by the protection policy. The data protection manager may identify a point in time specified by a backup schedule of a protection policy associated with the file system as a protection policy dependency confirmation event to confirm file system dependencies associated with the protection policy prior to initiating performance of the backup of the file system to avoid loss of dependent data stored on other file systems of the host.

The protection policy dependency confirmation event associated with the file system may be identified via other and/or additional methods without departing from embodiments disclosed herein.

In Step 402, file system dependency discovery by a data protection agent on the host is initiated. In one or more embodiments, the data protection manager may send a request to the data protection agent on the host to perform file system dependency discovery. The protection policy associated with the protection policy dependency confirmation event may include the host identifier associated with the protection policy. The data protection manager may identify the host and send the request to the data protection agent of the host. The request may be sent to the data protection agent using any appropriate method of data transmission without departing from embodiments disclosed herein. For example, the data protection manager may transmit the request as a message that includes one or more network packets through one or more network devices that operatively connect the data protection agent to the data protection manager. File system dependency discovery by a data protection agent on the host may be initiated via other and/or additional methods without departing from embodiments disclosed herein.

In Step 404, dependency information associated with the file system is obtained from the data protection agent. In one or more embodiments, the dependency information associated with the file system may be obtained from the data protection agent via the methods discussed below in FIG. 4B. The dependency information associated with the file system may be obtained from the data protection agent via other and/or additional methods without departing from embodiments disclosed herein. For additional information regarding obtaining dependency information associated with the file system from the data protection agent, refer to FIG. 4B.

In Step 406, a determination is made as to whether there are user dependency rules associated with the protection policy. In one or more embodiments, the data protection manager may parse the protection policy associated with the protection policy dependency confirmation event to identify any user dependency rules. The protection policy may or may not include user dependency rules (discussed below). In one or more embodiments, if the protection policy includes user dependency rules, then the data protection manager may determine that there are user dependency rules associated with the protection policy. In one or more embodiments, if the protection policy does not include user dependency rules, then the data protection manager may determine that there are no user dependency rules associated with the protection policy. The determination as to whether there are user dependency rules associated with the protection policy may be made via other and/or additional methods without departing from embodiments disclosed herein.

In one or more embodiments, user dependency rules may include one or more data structures that specify rules for including other file systems (or portions of other file systems) in the protection policy based on the dependency information. The user dependency rules may be generated by the user (e.g., a system administrator). The user dependency rules may include, for example, lists of file systems to include and/or exclude from the protection policy, lists of applications to include and/or exclude from the protection policy, lists of files to include and/or exclude from the protection policy, whether to include all dependent file systems specified by the dependency information, and/or a dependency priority threshold to use to determine whether to include a dependent file system. The user dependency rules may include other and/or additional rules for including other file systems (or portions of other file systems) in the protection policy based on the dependency information without departing from embodiments disclosed herein. As used herein, a dependent file system may refer to a file system in which includes application data associated with the file system corresponding to the protection policy. Not including the dependent file system in a backup of the file system may result in data loss. Thus, the file system may be described as depending on the dependent file system.

A dependency priority threshold may specify a priority value limit above which a corresponding dependent file system may be included in the protection policy. A priority value may include a numerical representation of the priority of the corresponding dependency. The higher the priority value, the more imperative it may be to include the dependent file system in the protection policy. The priority value may be assigned to dependent file system based on, for example, the types of application files included in the dependent file system, the quantity of application data stored in the dependent file system, a percentage of the application data stored in the dependent file system, etc.

For example, a database application of the file system corresponding to the protection policy may include only temporary file types in a first dependent file system and database files in a second dependent file system. Accordingly, the first dependent file system may be assigned a low priority threshold while the second dependent file system may be assigned a high priority threshold. As another example, a first dependent file system may include a kilobyte of application data of the file system and a second dependent file system may include a gigabyte of application data of the file system. The first dependent file system may be assigned a lower priority value than the second dependent file system. As yet another example, a first dependent file system may include 5% of the application data of an application of the file system and a second dependent file system may include 50% of the application data of the application of the file system. The first dependent file system may be assigned a lower priority value than the second dependent file system.

In one or more embodiments disclosed herein, if it is determined that there are user dependency rules associated with the protection policy, then the method proceeds to Step 408. In one or more embodiments disclosed herein, if it is determined that there are not user dependency rules associated with the protection policy, then the method proceeds to Step 412.

In Step 408, a determination is made as to whether the user dependency rules indicate a protection policy update. As discussed above, the user dependency rules specify rules for including other file systems (or portions of other file systems) in the protection policy based on the dependency information. In one or more embodiments, the data protection manager may compare the user dependency rules with the dependency information to determine whether the user dependency rules indicate a protection policy update. The data protection manager may determine that the user dependency rules indicate a protection policy update if the dependency information satisfies one or more of the user dependency rules and is not already included in the protection policy. The user dependency rules may be satisfied when: (i) the dependency information includes a file system or a file system that includes an application or file required to be included, (ii) there are dependent file systems and all dependent file systems are to be included, or (iii) dependent file systems are associated with a priority value above a dependency priority threshold. In one or more embodiments, if a user dependency rule is satisfied by the dependency information, then the data protection manager may determine that the user dependency rules indicate a protection policy update. In one or more embodiments, if no user dependency rule is satisfied by the dependency information, then the data protection manager may determine that the user dependency rules do not indicate a protection policy update. The determination to whether the user dependency rules indicate a protection policy update may be made via other and/or additional methods without departing from embodiments disclosed herein.

In one or more embodiments disclosed herein, if it is determined that the user dependency rules indicate a protection policy update, then the method proceeds to Step 410. In one or more embodiments disclosed herein, if it is determined that the user dependency rules do not indicate a protection policy update, then the method proceeds to Step 418.

In Step 410, the protection policy is updated based on the user dependency rules and the dependency information. In one or more embodiments, the data protection manager may update the protection policy using dependency information that satisfies user dependency rules. In other words, the data protection manager may include files, applications, and/or whole files systems of other dependent file systems specified by the dependency information that satisfy user dependency rules. As such, the data protection manager may include the file identifiers, the application identifiers, and/or the file system identifiers associated with the dependent file systems specified by the user selections in the protection policy. For example, the data protection manager may update the protection policy to include files and applications of one or more dependent file systems that correspond to an application of the file system associated with and already included in the protection policy that satisfy (i.e., are included in) lists of files, applications, and/or file systems to be included in the protection policy. As another example, the data protection manager may include all files and applications of one or more dependent file systems that correspond to an application of the file system associated with and already included in the protection policy if the user dependency rules specify all dependent file systems should be included. As yet another example, the data protection manager may include all files and applications of one or more dependent file systems that correspond to an application of the file system associated with and included in the protection policy if the dependent file systems are associated with a priority value above the dependency priority threshold.

In Step 412, the dependency information is provided to the user. In one or more embodiments, the data protection manager may provide the dependency information to the user. In one embodiment, the data protection manager may provide the dependency information directly through a user interface of the data protection manager that displays the dependency information to the user. The user interface may include any type of user interface without departing from embodiments disclosed herein. For example, the user interface may be a graphical user interface, a command line interface, etc. In another embodiment, the data protection manager may provide the dependency information to the user indirectly by sending the dependency information to a client (not shown in the system of FIG. 1A) used by the user. The user may then access the dependency information to the client. The dependency information may be sent to the client using any appropriate method of data transmission without departing from embodiments disclosed herein. For example, the data protection manager may transmit the dependency information as one or more messages that include one or more network packets through one or more network devices that operatively connect the data protection manager to the client. Dependency information may be provided to the use via other and/or additional methods without departing from embodiments disclosed herein.

In Step 414, user selections associated with the dependency information are obtained. In one or more embodiments, the data protection manager may obtain the user selections from the user. In one embodiment, the data protection manager may obtain the user selections directly from the user through the user interface. The user may provide one or more inputs (e.g., clicking boxes using a mouse, clicking buttons using a mouse, entering commands using a keyboard, touching portions of a screen, etc.) that specify the user selections. The user selections may refer to one or more data structures that specify all or a portion of the files and/or applications of dependent file systems specified in the dependency information that are not already included in the protection policy that the user desires to include in the protection policy. In other embodiments, the data protection manager may obtain the user selections from the client. The user selections may be provided to the data protection manager using any appropriate method of data transmission without departing from embodiments disclosed herein. For example, the client may transmit the user selections as one or more messages that include one or more network packets through one or more network devices that operatively connect the data protection manager to the client. The user selections associated with the dependency information may be obtained via other and/or additional methods without departing from embodiments disclosed herein.

In Step 416, a determination is made as to whether the user selections require a protection policy update. In one or more embodiments disclosed herein, the data protection manager may parse the user selections to determine whether the user selections require a protection policy update. As discussed above, the user selections may refer to one or more data structures that specify all or a portion of the files and/or applications of dependent file systems specified in the dependency information that are not already included in the protection policy that the user desires to include in the protection policy. In one or more embodiments, if the user selections includes one or more files, applications, or whole file systems associated with dependent file systems, then the data protection manager may determine that the user selections require a protection policy update. In one or more embodiments, if the user selections do not include any files, applications, or whole file systems associated with dependent file systems, then the data protection manager may determine that the user selections do not require a protection policy update. The determination as to whether the user selections require a protection policy update may be made via other and/or additional methods without departing from embodiments disclosed herein.

In one or more embodiments disclosed herein, if it is determined that the user selections require a protection policy update, then the method proceeds to Step 418. In one or more embodiments disclosed herein, if it is determined that the user selections do not require a protection policy update, then the method proceeds to Step 420.

In Step 418, the protection policy is updated based on user selections. In one or more embodiments, the data protection manager updates the protection policy to include the one or more files, applications, or whole file systems associated with dependent file systems that are included in the user selections. As such, the data protection manager may include the file identifiers, the application identifiers, and/or the file system identifiers associated with the dependent file systems specified by the user selections in the protection policy. The protection policy may be updated based on the user selections via other and/or additional methods without departing from embodiments disclosed herein.

In Step 420, the performance of data protection services based on the protection policy. In one or more embodiments, the data protection manager may send a request to the data protection agent of the host to generate a backup based on the protection policy. In request may specify the file system originally associated with the protection policy and/or the files, applications, and/or whole file systems associated with dependent file systems in which the original file system depends. In response to obtaining the request, the data protection agent may generate a backup of the file system and/or the files, applications, and/or whole file systems associated with dependent file systems specified by the request. The data protection manager may wait until a point in time specified by a backup schedule included in the protection policy occurs before sending the request. The request may be provided to the data protection agent using any appropriate method of data transmission without departing from embodiments disclosed herein. For example, the data protection manager may transmit the request as one or more messages that include one or more network packets through one or more network devices that operatively connect the data protection manager to the data protection agent. The performance of the data protection services based on the protection policy may be initiated via other and/or additional methods without departing from embodiments disclosed herein.

In one or more embodiments disclosed herein, the method ends following Step 420.

Figure 4B:
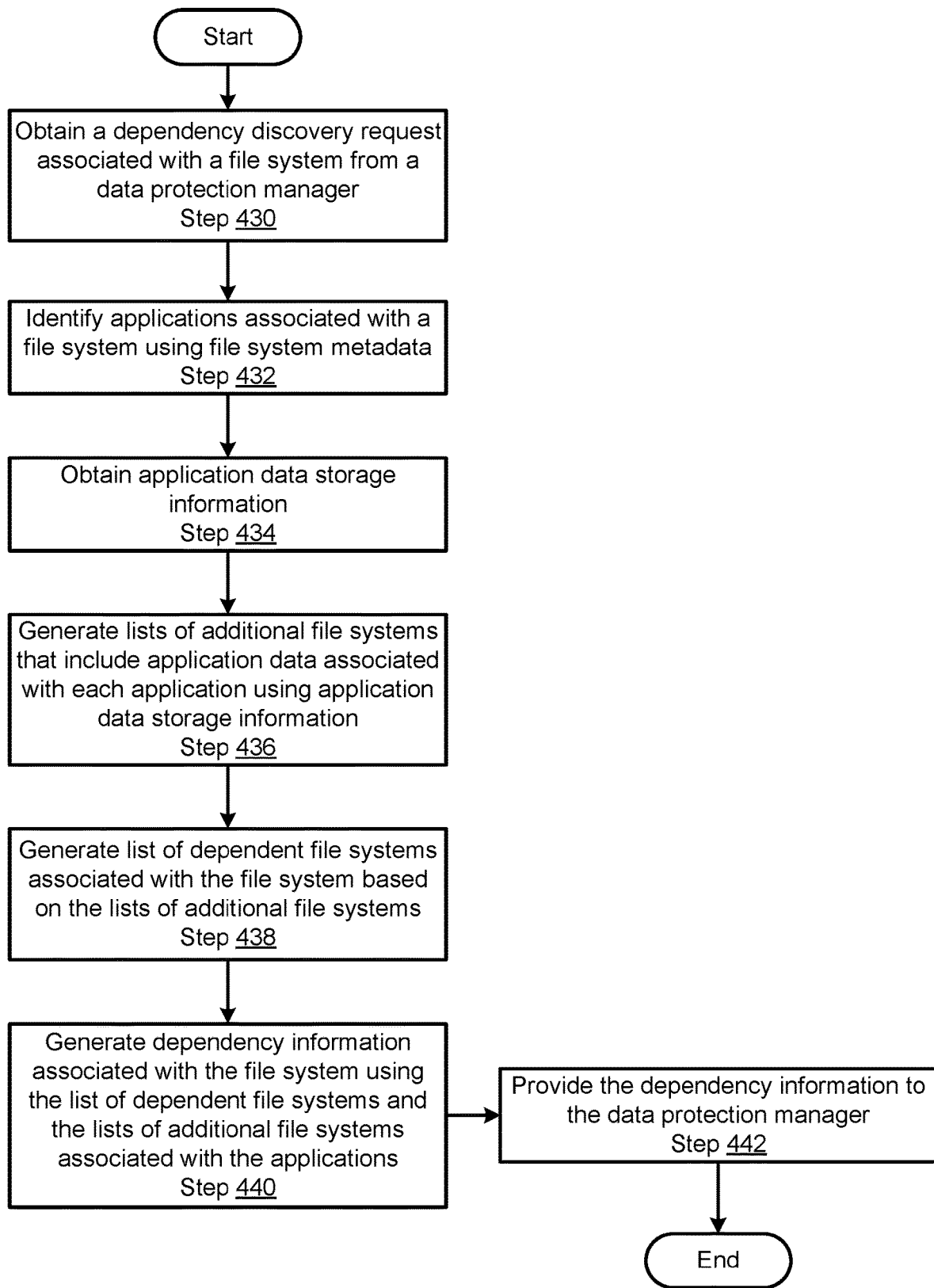
FIG. 4B shows a flowchart of a method for generating dependency information in accordance with one or more embodiments disclosed herein.

FIG. 4B shows a flowchart of a method for generating dependency information in accordance with one or more embodiments disclosed herein. The method shown in FIG. 4B may be performed by, for example, a data protection agent (e.g., 106, FIG. 1B). Other components of the system in FIGS. 1A-1C may perform all, or a portion, of the method of FIG. 4B without departing from the scope of the embodiments described herein. While FIG. 4B is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 430, a dependency discovery request associated with a file system is obtained from a data protection manager. In one or more embodiments, the data protection manager may send a request to the data protection agent on the host to perform file system dependency discovery associated with the file system. The request may include a file system identifier associated with the file system. The request may be sent to the data protection agent using any appropriate method of data transmission without departing from embodiments disclosed herein. For example, the data protection manager may transmit the request as a message that includes one or more network packets through one or more network devices that operatively connect the data protection agent to the data protection manager. A dependency discovery request associated with the file system may be obtained from the data protection manager via other and/or additional methods without departing from embodiments disclosed herein.

In Step 432, applications associated with the file system is identified using file system metadata. In one or more embodiments, the data protection agent may obtain all file system metadata from the file system metadata repository associated with the file system using the file system identifier corresponding to the file system. The obtained file system metadata may specify the applications associated with the file system. In one or more embodiments, the data protection agent may parse the obtained file system metadata associated with the file system to identify all applications associated with the file system. Applications associated with the file system may be identified using file system metadata via other and/or additional methods without departing from embodiments disclosed herein.

In Step 434, application data storage information is obtained. In one or more embodiments, the data protection agent may identify the VSS writers (not shown in FIG. 1B) associated with each application of the file system. The VSS writers may refer to services (e.g., computer instructions) which when executed by a processor of the host writes or otherwise stores application data (e.g., data blocks of files) for the application on the host and generates snapshots of application data. The VSS writer may know where application data associated with each application is stored. The data protection agent may invoke the VSS writers associated with each application to mimic a backup operation to obtain application data storage information associated with each application. The application data storage information may specify the storage locations of files of the application. The storage locations may include the file system identifier, data runs, the physical addresses, file sizes, pointers, logical to physical address mappings, and/or other or additional information specifying wherein application data is stored without departing from embodiments disclosed herein. If applications are not associated with a VSS writer, the data protection agent may manually parse all file system metadata to identify application storage information associated with the applications of the file system. Application data storage information may be obtained via other and/or additional methods without departing from embodiments disclosed herein.

In Step 436, lists of additional file systems that include application data associated with each application are generated using application data storage information. As discussed above, the application data storage information may include file system identifiers associated with each file of an application. In one or more embodiments, the data protection agent may parse the application data storage information to identify the file systems associated with each application and generate a list of additional file systems associated with each application of the file system corresponding to the protection policy. The data protection agent may generate a list of additional file systems associated for each application. The lists of additional file systems that include the application data associated with each application may be generated using application data storage information via other and/or additional methods without departing from embodiments disclosed herein.

In Step 438, a list of dependent file systems associated with the file system is generated based on the lists of additional file systems. In one or more embodiments, the data protection manager generates a list of dependent file systems using the lists of additional file systems. The data protection manager may include each additional file system associated with an application of the file system in the list of dependent file systems. The list of dependent file systems may include only one instance of each dependent file system even though the dependent file system may be an additional file system for multiple applications of the file system. The list of dependent file systems associated with the file system may be generated based on the lists of additional file systems via other and/or additional methods without departing from embodiments disclosed herein.

In Step 440, dependency information is generated using the list of dependent file systems and the lists of additional file systems associated with the applications. In one or more embodiments, the data protection agent may generate dependency information by including the list of dependent file systems and the list of additional file system associated with the applications in the dependency information. The data protection agent may further include the application data storage information associated with each application in the dependency information. Furthermore, the data protection agent may assign a priority value associated with each dependent file system using the lists of additional file systems and the application data storage information. The data protection agent may include or otherwise have access to data priority value assignment rules specified by the user (e.g., stored in host storage). The data priority value assignment rules may include mappings between dependency characteristic values or ranges of values and priority values. The dependency characteristics may include file types, amount of data associated with a file, and percentage of total application data associated with a file, etc. The dependency information may include other and/or additional information associated with dependencies between the file system associated with the protection policy and other file systems. Dependency information may be generated using the list of dependent file systems and the lists of additional file systems associated with the applications via other and/or additional methods without departing from embodiments disclosed herein.

In Step 442, the dependency information is provided to the data protection manager. In one or more embodiments, the data protection agent may send the dependency information to the data protection manager. The dependency information may be sent to the data protection manager using any appropriate method of data transmission without departing from embodiments disclosed herein. For example, the data protection agent may transmit the dependency information as a message that includes one or more network packets through one or more network devices that operatively connect the data protection agent to the data protection manager. The dependency information may be provided to the data protection manager via other and/or additional methods without departing from embodiments disclosed herein.

In one or more embodiments disclosed herein, the method ends following Step 442.

Figure 5A:
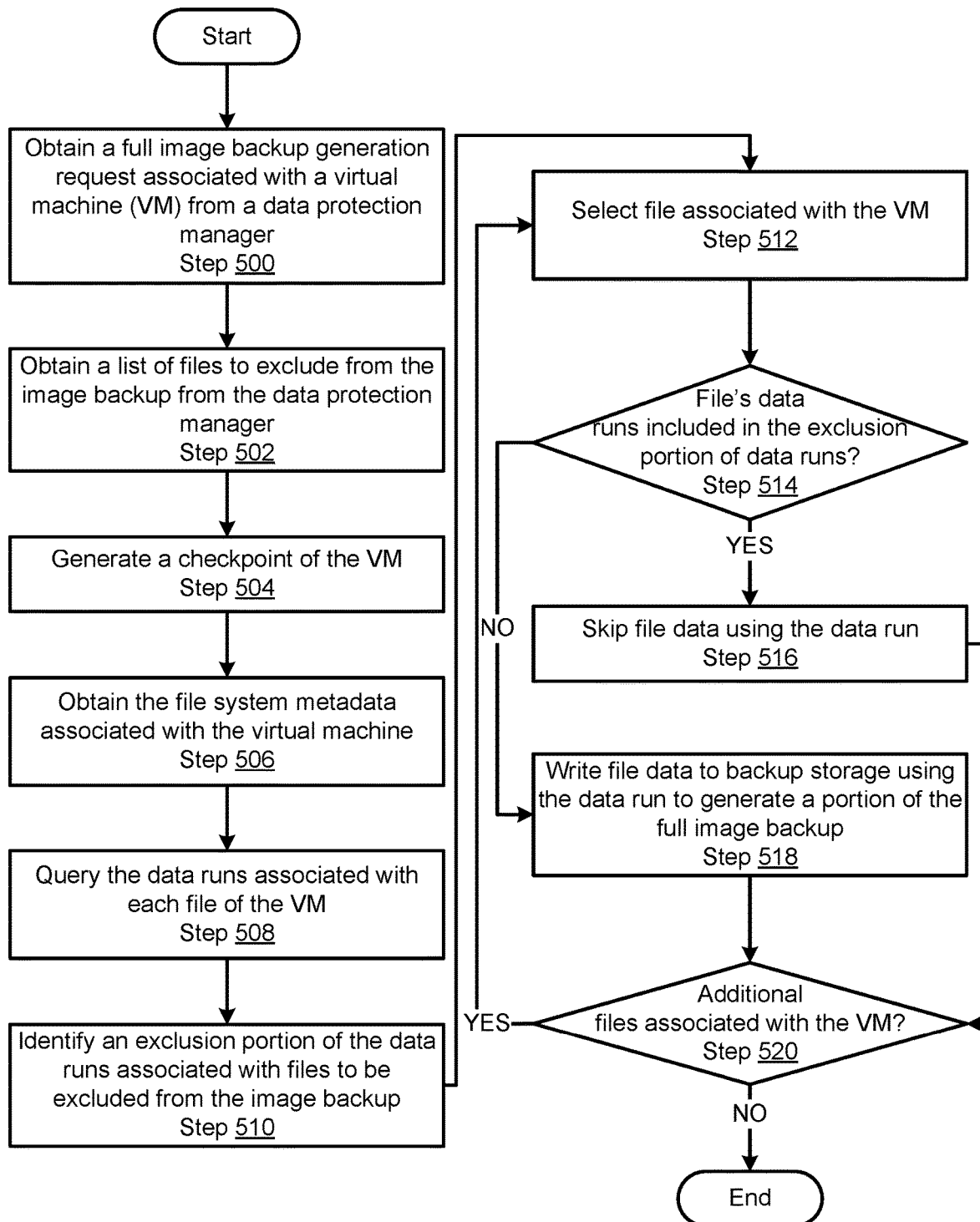
FIG. 5A shows a flowchart of a method for performing a full backup with exclusion in accordance with one or more embodiments disclosed herein.

FIG. 5A shows a flowchart of a method for generating dependency information in accordance with one or more embodiments disclosed herein. The method shown in FIG. 5A may be performed by, for example, a data protection agent (e.g., 106, FIG. 1B). Other components of the system in FIGS. 1A-1C may perform all, or a portion, of the method of FIG. 5A without departing from the scope of the embodiments described herein. While FIG. 5A is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 500, a full image backup generation request associated with a virtual machine (VM) is obtained from a data protection manager. In one or more embodiments, the data protection agent may obtain a request to generate a full image backup from the data protection manager associated with the VM. The data protection agent may identify the receipt of the request as the backup generation event. The request may include the VM identifier associated with the VM targeted by the request. In one or more embodiments, the request may include a backup storage information associated with one or more backup storages in which the to-be generated backup is to be stored. The backup storage information may include the backup storage identifier, a backup storage type, and/or connection information (e.g., network address, IP address, etc.). The request may include other and/or additional information associated with backup generation without departing from embodiments disclosed herein. In one or more embodiments, the data protection manager may send the request based on a protection policy associated with an application or the file system. The protection policy may be a data structure that specifies backup requirements (e.g., a backup schedule specifying points in time to generate backups, backup storage information associated with one or more backup storages to store the backup and/or portions of the backup, etc.). The protection policies may be generated by users and provided to the data protection manager, which may monitor the protection policies to initiate the performance of data protection services according to the backup requirements specified by the protection policy.

In another embodiment, the data protection manager may send the backup generation request in response to an on-demand backup generation request submitted by a user of the system. The user may submit the on-demand backup generation request through any type of user interface (e.g., graphical user interface) without departing from embodiments disclosed herein. The on-demand backup generation request may include backup storage information associated with one or more backup storages to store the backup and/or portions of the backup and/or other information associated with the backup generation without departing from embodiments disclosed herein.

The full image backup generation request associated with the VM may be obtained from a data protection manager via other and/or additional methods without departing from embodiments disclosed herein.

In Step 502, a list of files to exclude form the image backup is obtained from the data protection manager. In one or more embodiments, the data protection manager may send the list of files (e.g., file identifiers associated with the files) to exclude from the full image backup to the data protection agent. The list of data files to exclude from the image backup may be generated by a user. The list of files may be sent to the data protection agent using any appropriate method of data transmission without departing from embodiments disclosed herein. For example, the data protection manager may transmit the list of files as a message that includes one or more network packets through one or more network devices that operatively connect the data protection agent to the data protection manager. The list of files to exclude from the image backup may be obtained from the data protection manager via other and/or additional methods without departing from embodiments disclosed herein.

In Step 504, a checkpoint of the VM is generated. In one or more embodiments, the data protection agent may generate or initiate generation of a checkpoint of the VM associated with the image backup. In one or more embodiments, a VM checkpoint may refer to a differencing file or snapshot that captures the state, data, and/or hardware configuration of a VM in operation. The checkpoint may insure that the image of the VM is good and will not change during the generation of the backup. The checkpoint of the VM may be generated via other and/or additional methods without departing from embodiments disclosed herein.

In Step 506, file system metadata associated with the VM is obtained. As discussed above, the storage of the host may include file system metadata repository that stores information associated with files of VMs included in the file system of the host generated by user and/or VMs of the host during the performance of computer implemented services. The data protection agent may obtain file system metadata associated with the VM from the file system metadata repository. The data protection agent may use the VM identifier to obtain file system metadata associated with the VM. The data protection agent may use other appropriate methods, frameworks, or techniques to obtain file system metadata and other information regarding applications of the host (e.g., a Volume Shadow Copy Service (VSS)). The file system metadata associated with the application may be obtained via other and/or additional methods without departing from embodiments disclosed herein.

In Step 508, the data runs associated with each file associated with the VM are queried. As discussed above, each file stored on the host may be associated with one or more data runs as specified in the file system metadata. In one or more embodiments, the data protection agent may parse the file system metadata to obtain the data runs associated with each file of the VM using the obtained file system metadata. The data runs associated with each file of the VM may be queried from the file system metadata via other and/or additional methods without departing from embodiments disclosed herein.

In Step 510, an exclusion portion of the data runs associated with the files included in the list of files to be excluded from the image backup is identified. Each data run obtained as a result of the query in Step 508 may be associated with file identifier. In one or more embodiments, the data protection agent may compare the file identifiers associated with each obtained data run with the file identifiers included in the list of files to exclude from the backup. A portion of the data runs that are associated with a file identifier that is included in the list of files to exclude may be identified as the exclusion portion of the data runs. The exclusion portion of the data runs associated with the files included in the list of files to be excluded from the image backup may be identified via other and/or additional methods without departing from embodiments disclosed herein.

In Step 512, a file associated with the VM is selected. In one or more embodiments, the data protection agent may use the obtained file system metadata to select a file identifier associated with a file of the VM. The file associated with the selected file identifier may be the selected file. The data protection agent may select the first file in file system metadata that has not already been selected. Alternatively, the data protection agent may select a random file in the file system metadata that has not already been selected. After selecting the file, the data protection agent may tag the file or file identifier or otherwise indicate that the file has been selected to avoid selecting a previously selected file. A file associated with the VM may be selected via other and/or additional methods without departing from embodiments disclosed herein.

In Step 514, a determination is made as to whether the file's data runs are included in the exclusion portion of the data runs. In one or more embodiments, the data protection agent may compare the data runs associated with the selected file with the data runs included in the exclusion portion. In one or more embodiments, if the data runs of the selected file match data runs included in the exclusion portion, then the data protection agent may determine that the file's data runs are included in the exclusion portion of the data runs. In one or more embodiments, if the data runs of the selected file do not match any data runs included in the exclusion portion, then the data protection agent may determine that the file's data runs are not included in the exclusion portion of the data runs. The determination as to whether the file's data runs are included in the exclusion portion of the data runs may be made via other and/or additional methods without departing from embodiments disclosed herein.

In one or more embodiments disclosed herein, if it is determined that the file's data runs are included in the exclusion portion of the data runs, then the method proceeds to Step 516. In one or more embodiments disclosed herein, if it is determined that the file's data runs are not included in the exclusion portion of the data runs, then the method proceeds to Step 518.

In Step 516, the file data is skipped using the data runs. In one or more embodiments, the data protection agent may skip the one or more data blocks of the selected file corresponding to the data runs. The data protection agent may also skip including the file system metadata associated with the file in the backup metadata associated with the backup. As a result, the file may be excluded from the backup. The file data may be skipped using the data runs via other and/or additional methods without departing from embodiments disclosed herein.

In Step 518, the file data is written to the backup storage using the data run to generate a portion of the full image backup. In one or more embodiments, the data protection agent may write the one or more data blocks of the selected file corresponding to the data runs of the file to the backup storage to generate a portion of the full image backup. The data protection agent may also write the file system metadata associated with the file in the backup metadata associated with the full image backup. As a result, the file may be included in the backup. The file data may be written to the backup storage using the data runs to generate a portion of the full image backup via other and/or additional methods without departing from embodiments disclosed herein.

In Step 520, a determination is made as to whether there are additional files associated with the VM. As discussed above, the data protection agent may tag or otherwise indicate whether the file identifiers of the files of the VM that have been selected. In one or more embodiments, the data protection manager may parse the file system metadata associated with the VM to check whether there are any file identifiers that were not tagged or otherwise indicated that they have been selected. The data protection agent may remove the tags after every file associated with the VM has been selected. In one or more embodiments disclosed herein, if the data protection agent identifies a file identifier that has not been tagged or otherwise indicated that it has been selected, then the data protection agent may determine that there are additional files associated with the VM. In one or more embodiments disclosed herein, if the data protection agent does not identify any file identifier that has not been tagged or otherwise indicated that it has been selected, then the data protection agent may determine that there are no additional files associated with the VM. The determination as to whether there are additional files associated with the VM may be made via other and/or additional methods without departing from embodiments disclosed herein.

In one or more embodiments disclosed herein, if it is determined that there are additional files in the virtual hard disk, then the method proceeds to Step 512. In one or more embodiments disclosed herein, if it is determined that there are not additional files in the virtual hard disk, then the method ends following Step 520.

Figure 5B:
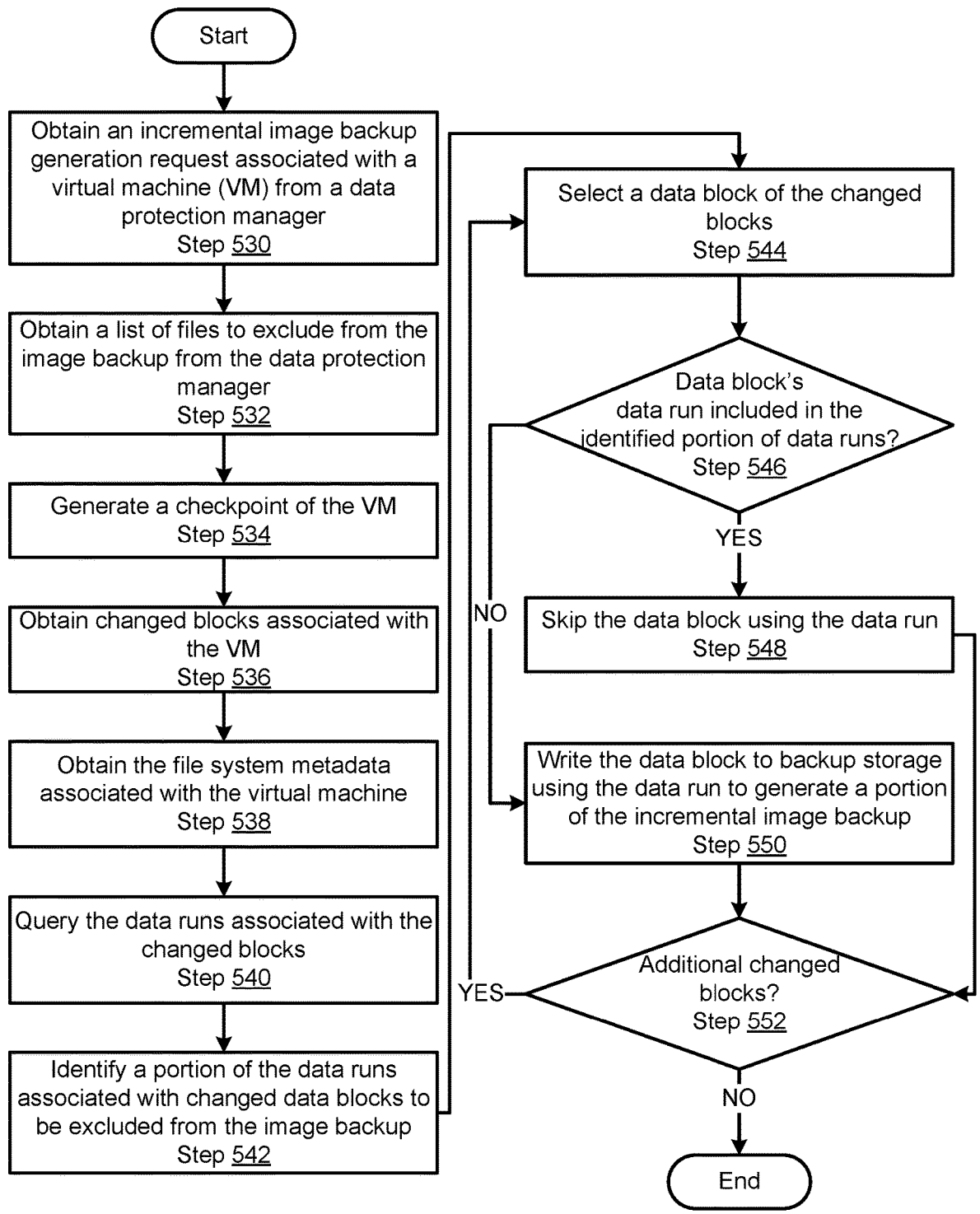
FIG. 5B shows a flowchart of a method for performing an incremental backup with exclusion in accordance with one or more embodiments disclosed herein.

FIG. 5B shows a flowchart of a method for performing an incremental backup with exclusion in accordance with one or more embodiments disclosed herein. The method shown in FIG. 5B may be performed by, for example, a data protection agent (e.g., 106, FIG. 1B). Other components of the system in FIGS. 1A-1C may perform all, or a portion, of the method of FIG. 5B without departing from the scope of the embodiments described herein. While FIG. 5B is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 530, an incremental image backup generation request associated with a virtual machine (VM) is obtained from a data protection manager. In one or more embodiments, the data protection agent may obtain a request to generate an incremental image backup from the data protection manager associated with the VM. The data protection agent may identify the receipt of the request as the backup generation event. The request may include the VM identifier associated with the VM targeted by the request. In one or more embodiments, the request may include a backup storage information associated with one or more backup storages in which the to-be generated backup is to be stored. The backup storage information may include the backup storage identifier, a backup storage type, and/or connection information (e.g., network address, IP address, etc.). The request may include other and/or additional information associated with backup generation without departing from embodiments disclosed herein. In one or more embodiments, the data protection manager may send the request based on a protection policy associated with an application or the file system. The protection policy may be a data structure that specifies backup requirements (e.g., a backup schedule specifying points in time to generate backups, backup storage information associated with one or more backup storages to store the backup and/or portions of the backup, etc.). The protection policies may be generated by users and provided to the data protection manager, which may monitor the protection policies to initiate the performance of data protection services according to the backup requirements specified by the protection policy.

In another embodiment, the data protection manager may send the backup generation request in response to an on-demand backup generation request submitted by a user of the system. The user may submit the on-demand backup generation request through any type of user interface (e.g., graphical user interface) without departing from embodiments disclosed herein. The on-demand backup generation request may include backup storage information associated with one or more backup storages to store the backup and/or portions of the backup and/or other information associated with the backup generation without departing from embodiments disclosed herein.

The incremental image backup generation request associated with the VM may be obtained from a data protection manager via other and/or additional methods without departing from embodiments disclosed herein.

In Step 532, a list of files to exclude form the image backup is obtained from the data protection manager. In one or more embodiments, the data protection manager may send the list of files (e.g., file identifiers associated with the files) to exclude from the full image backup to the data protection agent. The list of data files to exclude from the image backup may be generated by a user. The list of files may be sent to the data protection agent using any appropriate method of data transmission without departing from embodiments disclosed herein. For example, the data protection manager may transmit the list of files as a message that includes one or more network packets through one or more network devices that operatively connect the data protection agent to the data protection manager. The list of files to exclude from the image backup may be obtained from the data protection manager via other and/or additional methods without departing from embodiments disclosed herein.

In Step 534, a checkpoint of the VM is generated. In one or more embodiments, the data protection agent may generate or initiate generation of a checkpoint of the VM associated with the image backup. In one or more embodiments, a VM checkpoint may refer to a differencing file or snapshot that captures the state, data, and/or hardware configuration of a VM in operation. The checkpoint may insure that the image of the VM is good and will not change during the generation of the backup. The checkpoint of the VM may be generated via other and/or additional methods without departing from embodiments disclosed herein.

In Step 536, changed blocks associated with the VM are obtained. In one or more embodiments, the data protection agent may obtain the changed blocks associated with the VM using Change Block Tracking (CBT) service (e.g., computer instructions), which when executed by a processor of the host monitor data blocks of VMs over time. The data protection agent may request and obtain the changed blocks that have changed since the previous backup of the VM was generated from the CBT service. Other block monitoring services may be used (e.g., Resilient Change Tracking (RCT)) without departing from embodiments disclosed herein. The changed blocks associated with the VM may be obtained via other and/or additional methods without departing from embodiments disclosed herein.

In Step 538, file system metadata associated with the VM is obtained. As discussed above, the storage of the host may include file system metadata repository that stores information associated with files of VMs included in the file system of the host generated by user and/or VMs of the host during the performance of computer implemented services. The data protection agent may obtain file system metadata associated with the VM from the file system metadata repository. The data protection agent may use the VM identifier to obtain file system metadata associated with the VM. The data protection agent may use other appropriate methods, frameworks, or techniques to obtain file system metadata and other information regarding applications of the host (e.g., a Volume Shadow Copy Service (VSS)). The file system metadata associated with the application may be obtained via other and/or additional methods without departing from embodiments disclosed herein.

In Step 540, the data runs associated with each file associated with the VM are queried. As discussed above, each file stored on the host may be associated with one or more data runs as specified in the file system metadata. In one or more embodiments, the data protection agent may parse the file system metadata to obtain the data runs associated with each file of the VM using the obtained file system metadata. The data runs associated with each file of the VM may be queried from the file system metadata via other and/or additional methods without departing from embodiments disclosed herein.

In Step 542, an exclusion portion of the data runs associated with the changed blocks included in the list of files to exclude from the image backup is identified. Each data run corresponding to a data block obtained as a result of the query in Step 540 may be associated with a file identifier included in the file system metadata. The data protection agent may identify the data block identifiers associated with each file included in the list of files to exclude from the backup using the file system metadata. In one or more embodiments, the data protection agent may compare the data block identifiers associated with each obtained data run with the data block identifiers associated with the file identifiers in the list of files to exclude from the backup. A portion of the data runs that are associated with a file identifier that is included in the list of files to exclude may be identified as the exclusion portion of the data runs. The exclusion portion of the data runs associated with the data blocks of files included in the list of files to be excluded from the image backup may be identified via other and/or additional methods without departing from embodiments disclosed herein.

In Step 544, a data block of the changed data blocks is selected. In one or more embodiments, the data protection agent may use the obtained file system metadata to select a data block identifier in the list of changed blocks. The data block associated with the selected data block identifier may be the selected data block. The data protection agent may select the first data block in the list of changed data blocks that has not already been selected. Alternatively, the data protection agent may select a random data block in the list of changed data blocks that has not already been selected. After selecting the data block, the data protection agent may tag the data block or data block identifier or otherwise indicate that the data block has been selected to avoid selecting a previously selected data block. A data block of the changed data blocks may be selected via other and/or additional methods without departing from embodiments disclosed herein.

In Step 546, a determination is made as to whether the data block's data runs are included in the exclusion portion of the data runs. In one or more embodiments, the data protection agent may compare the data runs associated with the selected data block with the data runs included in the exclusion portion. In one or more embodiments, if the data runs of the selected data block match a data run included in the exclusion portion, then the data protection agent may determine that the data block's data runs are included in the exclusion portion of the data runs. In one or more embodiments, if the data runs of the selected data block do not match any data runs included in the exclusion portion, then the data protection agent may determine that the data block's data runs are not included in the exclusion portion of the data runs. The determination as to whether the data block's data runs are included in the exclusion portion of the data runs may be made via other and/or additional methods without departing from embodiments disclosed herein.

In one or more embodiments disclosed herein, if it is determined that the data block's data run is included in the exclusion portion of the data runs, then the method proceeds to Step 548. In one or more embodiments disclosed herein, if it is determined that the data block's data run is not included in the exclusion portion of the data runs, then the method proceeds to Step 550.

In Step 548, the data block is skipped using the data run. In one or more embodiments, the data protection agent may skip the selected data block of the corresponding to the data runs. The data protection agent may also skip including the file system metadata associated with the data block in the backup metadata associated with the backup. As a result, the data block may be excluded from the backup. The data block data may be skipped using the data runs via other and/or additional methods without departing from embodiments disclosed herein.

In Step 550, the data block is written to the backup storage using the data run to generate a portion of the incremental image backup. In one or more embodiments, the data protection agent may write the data block corresponding to the data runs of the selected data block to the backup storage to generate a portion of the incremental image backup. The data protection agent may also write the file system metadata associated with the data block in the backup metadata associated with the incremental image backup. As a result, the data block may be included in the backup. The data block may be written to the backup storage using the data runs to generate a portion of the incremental image backup via other and/or additional methods without departing from embodiments disclosed herein.

In Step 552, a determination is made as to whether there are additional changed blocks. As discussed above, the data protection agent may tag or otherwise indicate whether the data block identifiers of the changed blocks of the VM that have been selected. In one or more embodiments, the data protection manager may parse the list of changed blocks associated with the VM to check whether there are any data block identifiers that were not tagged or otherwise indicated that they have been selected. The data protection agent may remove the tags after every file associated with the VM has been selected. In one or more embodiments disclosed herein, if the data protection agent identifies a data block identifier that has not been tagged or otherwise indicated that it has been selected, then the data protection agent may determine that there are additional data block associated with the VM. In one or more embodiments disclosed herein, if the data protection agent does not identify any data block identifier that has not been tagged or otherwise indicated that it has been selected, then the data protection agent may determine that there are no additional data blocks in the list of changed blocks associated with the VM. The determination as to whether there are additional data block associated with the VM may be made via other and/or additional methods without departing from embodiments disclosed herein.

In one or more embodiments disclosed herein, if it is determined that there are additional changed blocks, then the method proceeds to Step 544. In one or more embodiments disclosed herein, if it is determined that there are not additional changed blocks, then the method ends following Step 552.

Figure 6A:
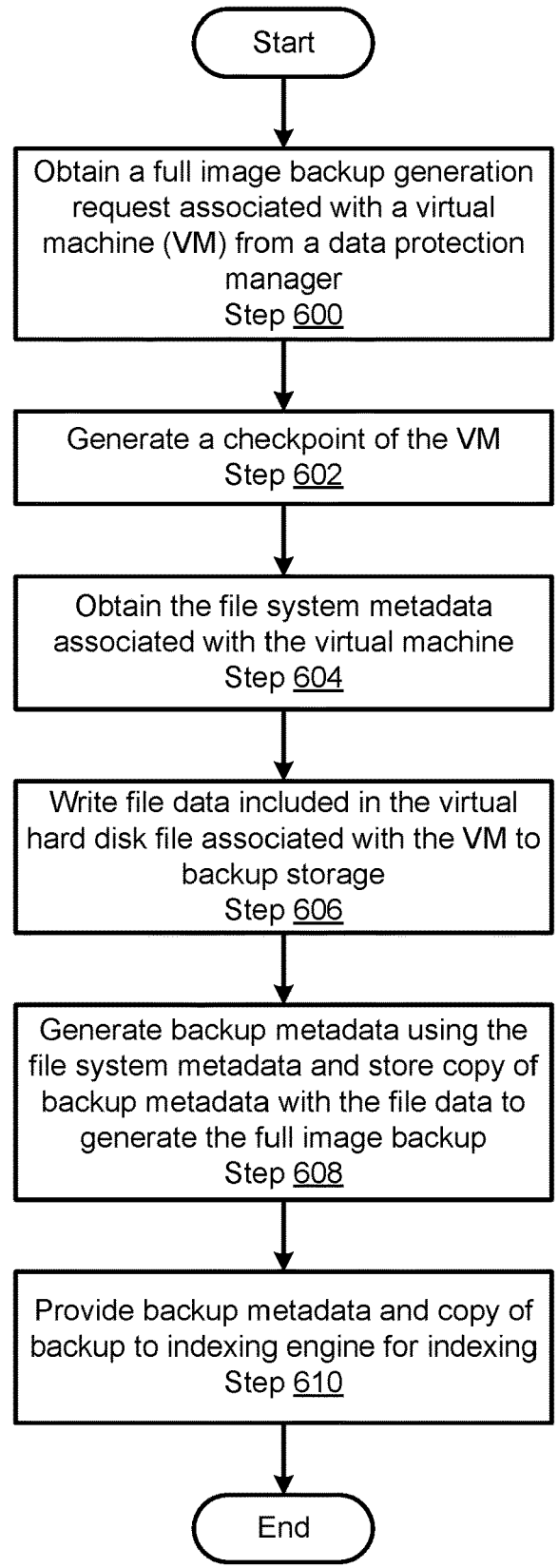
FIG. 6A shows a flowchart of a method for performing a full image backup with indexing in accordance with one or more embodiments disclosed herein.

FIG. 6A shows a flowchart of a method for performing a full image backup with indexing in accordance with one or more embodiments disclosed herein. The method shown in FIG. 6A may be performed by, for example, a data protection agent (e.g., 106, FIG. 1B). Other components of the system in FIGS. 1A-1C may perform all, or a portion, of the method of FIG. 6A without departing from the scope of the embodiments described herein. While FIG. 6A is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 600, obtain a full image backup generation request associated with a virtual machine (VM) from a data protection manager. In one or more embodiments, a full image backup generation request associated with a virtual machine (VM) is obtained from a data protection manager. In one or more embodiments, the data protection agent may obtain a request to generate a full image backup from the data protection manager associated with the VM. The data protection agent may identify the receipt of the request as the backup generation event. The request may include the VM identifier associated with the VM targeted by the request. In one or more embodiments, the request may include a backup storage information associated with one or more backup storages in which the to-be generated backup is to be stored. The backup storage information may include the backup storage identifier, a backup storage type, and/or connection information (e.g., network address, IP address, etc.). The request may include other and/or additional information associated with backup generation without departing from embodiments disclosed herein. In one or more embodiments, the data protection manager may send the request based on a protection policy associated with an application or the file system. The protection policy may be a data structure that specifies backup requirements (e.g., a backup schedule specifying points in time to generate backups, backup storage information associated with one or more backup storages to store the backup and/or portions of the backup, etc.). The protection policies may be generated by users and provided to the data protection manager, which may monitor the protection policies to initiate the performance of data protection services according to the backup requirements specified by the protection policy.

In another embodiment, the data protection manager may send the backup generation request in response to an on-demand backup generation request submitted by a user of the system. The user may submit the on-demand backup generation request through any type of user interface (e.g., graphical user interface) without departing from embodiments disclosed herein. The on-demand backup generation request may include backup storage information associated with one or more backup storages to store the backup and/or portions of the backup and/or other information associated with the backup generation without departing from embodiments disclosed herein.

The full image backup generation request associated with the VM may be obtained from a data protection manager via other and/or additional methods without departing from embodiments disclosed herein.

In Step 602, a checkpoint of the VM is generated. In one or more embodiments, the data protection agent may generate or initiate generation of a checkpoint of the VM associated with the image backup. In one or more embodiments, a VM checkpoint may refer to a differencing file or snapshot that captures the state, data, and/or hardware configuration of a VM in operation. The checkpoint may insure that the image of the VM is good and will not change during the generation of the backup. The checkpoint of the VM may be generated via other and/or additional methods without departing from embodiments disclosed herein.

In Step 604, file system metadata associated with the VM is obtained. As discussed above, the storage of the host may include file system metadata repository that stores information associated with files of VMs included in the file system of the host generated by user and/or VMs of the host during the performance of computer implemented services. The data protection agent may obtain file system metadata associated with the VM from the file system metadata repository. The data protection agent may use the VM identifier to obtain file system metadata associated with the VM. The data protection agent may use other appropriate methods, frameworks, or techniques to obtain file system metadata and other information regarding applications of the host (e.g., a Volume Shadow Copy Service (VSS)). The file system metadata associated with the application may be obtained via other and/or additional methods without departing from embodiments disclosed herein.

In Step 606, file data included in the virtual hard disk file associated with the VM is written to the backup storage. In one or more embodiments, the data protection agent may write the one or more data blocks associated with the VM to the backup storage to generate a full image backup. As a result, the files of the VM may be included in the backup. The file data included in the virtual hard disk file associated with the VM may be written to the backup storage via other and/or additional methods without departing from embodiments disclosed herein.

In Step 608, backup metadata is generated using the file system metadata and a copy of the backup metadata is stored with the file data to generate the full image backup. In one or more embodiments, the data protection agent may generate backup metadata based on the backup and the file system metadata. The data protection manager may generate and include checksums (discussed below) associated with the files included in the backup and include the checksums in the backup metadata. The data protection agent may generate a backup metadata file and include all, or a portion of the file system metadata in the backup metadata file. As a result, the backup metadata may include, for each file, a file identifier associated with the file, a file name associated with the file, the data runs associated with each file, the application identifier associated with the file, and a parent file or folder associated with the file. The backup metadata may include other and/or additional information without departing from embodiments disclosed herein.

In one or more embodiments, a data run may be associated with a data block of a file. Each file may include one or more data blocks. A data run may include an offset and data block extents. An offset may refer to one or more data structures that specify the distance from a reference point in a file system-based backup storage that includes the start of a file in the storage volume (e.g., virtual hard disk on the host or the backup storage). The distance may refer to the number of physical addresses or the quantity of data (e.g., bytes) between a reference point in the storage and the start of a file. The reference point may be a physical address that includes the first file of the backup or a base address in a storage. Since the backup may be stored according to the hierarchy of files included in the backup storage, the offset may be used to collect only a specifically requested file in the backup during backup access services. The offset may be derived from the backup itself or from the file system metadata (e.g., the parent file identifiers and the size or lengths of each file). The offset may include other and/or additional information without departing from embodiments disclosed herein.

In one or more embodiments, data block extents may refer to one or more data structures that specify where a data block and/or portions of data blocks of a block-based backup and file begin and end in the storage of the host and/or the backup storage. The data block extents may be obtained by the data protection agent based on the file system metadata and/or the backup. The data block extents may be pointers that reference locations in a backup storage where a data block or portion of a data block of a backup begins and ends. The data block extents may be used to identify and obtain specific data blocks of a block-based backup. Each data block extent of the data block extents may be associated with a data block or a portion of a data block of a backup. Each data block extent may be mapped to, or otherwise associated with, a file identifier of a file in the file system. The data block extents may include other and/or additional information and may be used for other and/or additional purposes without departing from embodiments disclosed herein.

The data protection agent may also include backup information in the backup metadata which may include an assigned backup identifier associated with the backup, a creation timestamp associated with the backup, backup type (e.g., full image backup or incremental image backup), and the targeted backup storage for the backup (e.g., as specified by the backup request obtained from the data protection manager). If more than one backup storage is used to store portions of the backup, the backup metadata file may be updated to include multiple instances of backup information associated with each backup storage. The backup metadata may be written to the backup storage and included with the full image backup. The backup metadata may be generated based on the file system metadata and the backup and a copy of the backup metadata may be stored with the file data to generate the full image backup via other and/or additional methods without departing from embodiments disclosed herein.

In Step 610, backup metadata and a copy of the backup is provided to indexing engine for indexing. In one or more embodiments, the data protection agent sends the backup metadata and a copy of the backup to the indexing engines (not shown in FIGS. 1A-1C). The indexing engines may be included in or otherwise operatively connected to the data protection manager. The indexing engines may be computer instructions, which when executed by a processor (e.g., of the data protection manager or another entity), may perform indexing on backups using backup metadata. Indexing may refer to parsing backups and classifying backup contents for quickly identifying and obtaining specific portions of backups. In response to obtaining the backup metadata and the backup, the indexing engines perform indexing on the backup using the backup metadata. The backup metadata and a copy of the backup may be sent to the indexing engines via other and/or additional methods without departing from embodiments disclosed herein.

In one or more embodiments disclosed herein, the method ends following Step 610.

Figure 6B:
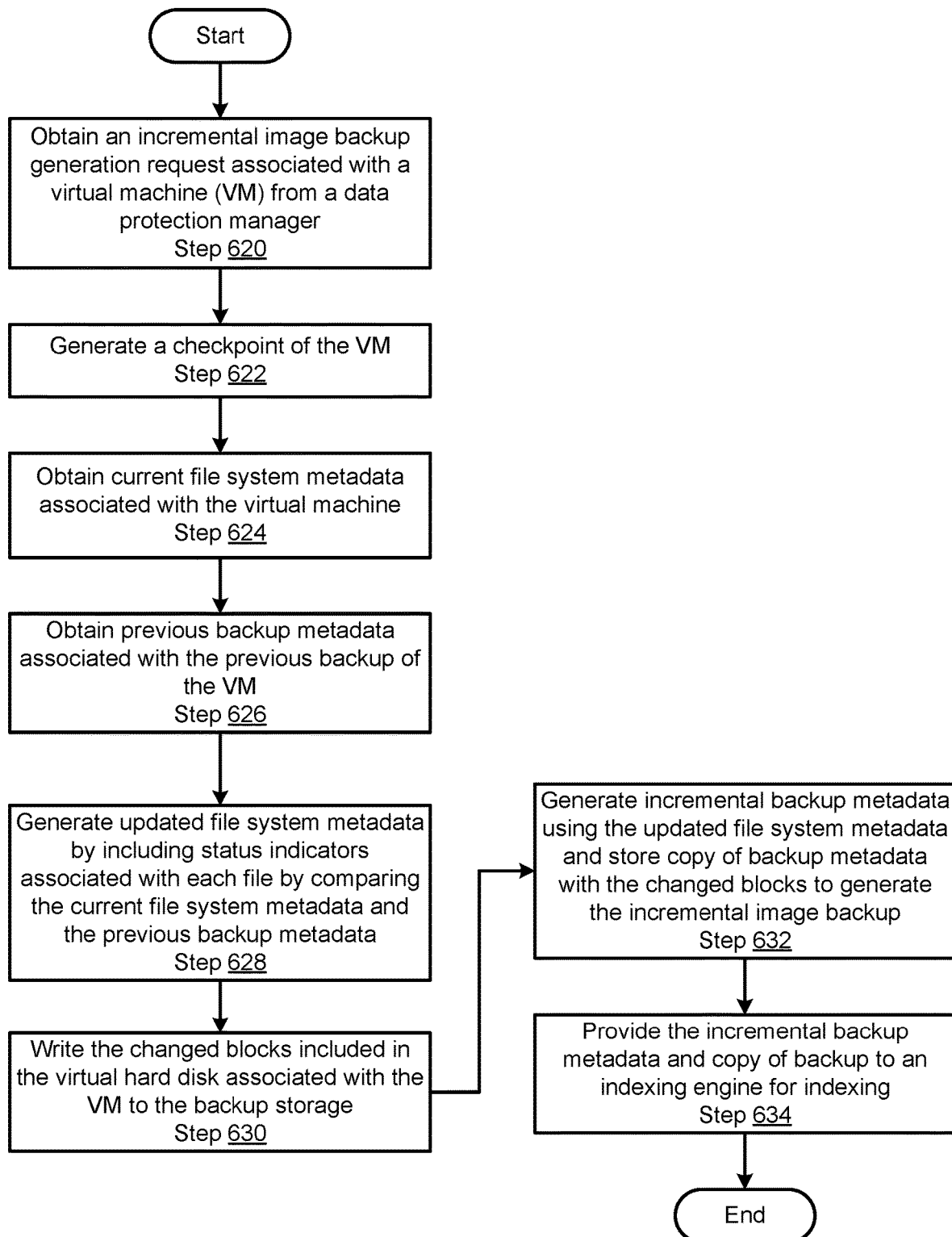
FIG. 6B shows a flowchart of a method for performing an incremental image backup with indexing in accordance with one or more embodiments disclosed herein.

FIG. 6B shows a flowchart of a method for performing an incremental image backup with indexing in accordance with one or more embodiments disclosed herein. The method shown in FIG. 6B may be performed by, for example, a data protection agent (e.g., 106, FIG. 1B). Other components of the system in FIGS. 1A-1C may perform all, or a portion, of the method of FIG. 6B without departing from the scope of the embodiments described herein. While FIG. 6B is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 620, obtain an incremental image backup generation request associated with a virtual machine (VM) from a data protection manager. In one or more embodiments, the data protection agent may obtain a request to generate an incremental image backup from the data protection manager associated with the VM. The data protection agent may identify the receipt of the request as the backup generation event. The request may include the VM identifier associated with the VM targeted by the request. In one or more embodiments, the request may include a backup storage information associated with one or more backup storages in which the to-be generated backup is to be stored. The backup storage information may include the backup storage identifier, a backup storage type, and/or connection information (e.g., network address, IP address, etc.). The request may include other and/or additional information associated with backup generation without departing from embodiments disclosed herein. In one or more embodiments, the data protection manager may send the request based on a protection policy associated with an application or the file system. The protection policy may be a data structure that specifies backup requirements (e.g., a backup schedule specifying points in time to generate backups, backup storage information associated with one or more backup storages to store the backup and/or portions of the backup, etc.). The protection policies may be generated by users and provided to the data protection manager, which may monitor the protection policies to initiate the performance of data protection services according to the backup requirements specified by the protection policy.

In another embodiment, the data protection manager may send the backup generation request in response to an on-demand backup generation request submitted by a user of the system. The user may submit the on-demand backup generation request through any type of user interface (e.g., graphical user interface) without departing from embodiments disclosed herein. The on-demand backup generation request may include backup storage information associated with one or more backup storages to store the backup and/or portions of the backup and/or other information associated with the backup generation without departing from embodiments disclosed herein.

The incremental image backup generation request associated with the VM may be obtained from a data protection manager via other and/or additional methods without departing from embodiments disclosed herein.

In Step 622, a checkpoint of the VM is generated. In one or more embodiments, the data protection agent may generate or initiate generation of a checkpoint of the VM associated with the image backup. In one or more embodiments, a VM checkpoint may refer to a differencing file or snapshot that captures the state, data, and/or hardware configuration of a VM in operation. The checkpoint may insure that the image of the VM is good and will not change during the generation of the backup. The checkpoint of the VM may be generated via other and/or additional methods without departing from embodiments disclosed herein.

In Step 624, current file system metadata associated with the VM is obtained. As discussed above, the storage of the host may include file system metadata repository that stores information associated with files included in the file system of the host generated by the user and/or VMs of the host during the performance of computer implemented services. The current file system metadata may be associated with the current state of the file system. Said another way, the current file system metadata may be associated with current data stored in the file system on the host whereas the backup metadata may be associated with a backup of a previous state of the file system (or a portion of the file system associated with the application). The data protection agent may obtain current file system metadata associated with the VM from the file system metadata repository. The data protection agent may use the VM identifier to obtain file system metadata associated with the VM. The data protection manager may use other appropriate methods, frameworks, or techniques to obtain file system metadata and other information regarding applications of the host (e.g., a Volume Shadow Copy Service (VSS)). The current file system metadata associated with the VM may be obtained via other and/or additional methods without departing from embodiments disclosed herein.

In Step 626, previous backup metadata associated with the previous backup of the VM. In one or more embodiments, the data protection agent sends a request for the backup metadata associated with a backup associated with the application to the data protection manager. The request may include the VM identifier associated with the VM and/or a backup identifier associated with a backup corresponding to the VM. In response to obtaining the request, the data protection manager obtains and sends the backup metadata associated with the most recent backup of the VM or the backup specified by the backup identifier to the data protection agent. The backup metadata and the request may be provided to and from the data protection agent using any appropriate method of data transmission without departing from embodiments disclosed herein. For example, the data protection agent may transmit the request as a message that includes one or more network packets through one or more network devices that operatively connect the data protection agent to the data protection manager. Additionally, the data protection manager may transmit the backup metadata as a message that includes one or more network packets through one or more network devices that operatively connect the data protection agent and the data protection manager. The backup previous metadata associated with the previous backup of the VM may be obtained from the data protection manager via other and/or additional methods without departing from embodiments disclosed herein.

In Step 628, updated file system metadata is generated by including status indicators associated with each file by comparing the current file system metadata and the previous backup metadata. In one or more embodiments, the data protection agent may compare the current file system metadata with the previous backup metadata to generate status indicators associated with each file. A status indicator may refer to a tag, flag, or other indication that specifies whether the file is new, deleted, modified, or unmodified. In one or more embodiments, the data protection agent may, for each file, compare the current data runs of the current file system metadata with the backup data runs of the previous backup metadata to generate a status indicator associated with each file. The current data runs and backup data runs of a files data blocks that do not match may include different data. This may be because the data was modified since the previous backup was generated. Accordingly, the data protection agent may generate a status indicator specifying that the file is a modified file. Alternatively, if current and backup data runs of a the data blocks of a file match, the corresponding data blocks in both the host file and the backup file may match indicating that the file remains unchanged since the previous backup was generated. Accordingly, the data protection agent may generate a status indicator specifying that the file is an unmodified file. Additionally, files that are included in the current data runs but not the backup data runs may be associated with new files generated after the previous backup was generated. Accordingly, the data protection agent may generate a status indicator specifying that such a file is a new file. Finally, files that are included in the backup data runs but not the current data runs may be associated with deleted files that were deleted after the previous backup was generated. Accordingly, the data protection agent may generate a status indicator specifying that such a file is a deleted file. Updated file system metadata may be generated by including status indicators associated with each file by comparing the current file system metadata and the previous backup metadata via other and/or additional methods without departing from embodiments disclosed herein.

In Step 630, changed blocks included in the virtual hard disk file associated with the VM is written to the backup storage. In one or more embodiments, the data protection agent may obtain the changed blocks associated with the VM using Change Block Tracking (CBT) service (e.g., computer instructions), which when executed by a processor of the host monitor data blocks of VMs over time. The data protection agent may request and obtain the changed blocks that have changed since the previous backup of the VM was generated from the CBT service. Other block monitoring services may be used (e.g., Resilient Change Tracking (RCT)) without departing from embodiments disclosed herein. The changed blocks associated with the VM may be obtained via other and/or additional methods without departing from embodiments disclosed herein. In one or more embodiments, the data protection agent may then write the one or more data blocks associated with the changed blocks to the backup storage to generate an incremental image backup. As a result, the changed files of the VM may be included in the backup. The file data included in the virtual hard disk file associated with the VM may be written to the backup storage via other and/or additional methods without departing from embodiments disclosed herein.

In Step 632, incremental backup metadata is generated using the updated file system metadata and a copy of the incremental backup metadata is stored with the changed blocks to generate the incremental image backup. In one or more embodiments, the data protection agent may generate incremental backup metadata based on the backup and the updated file system metadata. The data protection manager may generate and include checksums (discussed below) associated with the files included in the backup and include the checksums in the incremental backup metadata. The data protection agent may generate an incremental backup metadata file and include all, or a portion of the updated file system metadata in the incremental backup metadata file. As a result, the incremental backup metadata may include, for each file, a file identifier associated with the file, a file name associated with the file, the data runs associated with each file, the application identifier associated with the file, the status indicator, and a parent file or folder associated with the file. The incremental backup metadata may include other and/or additional information without departing from embodiments disclosed herein.

In one or more embodiments, a data run may be associated with a data block of a file. Each file may include one or more data blocks. A data run may include an offset and data block extents. An offset may refer to one or more data structures that specify the distance from a reference point in a file system-based backup storage that includes the start of a file in the storage volume (e.g., virtual hard disk on the host or the backup storage). The distance may refer to the number of physical addresses or the quantity of data (e.g., bytes) between a reference point in the storage and the start of a file. The reference point may be a physical address that includes the first file of the backup or a base address in a storage. Since the backup may be stored according to the hierarchy of files included in the backup storage, the offset may be used to collect only a specifically requested file in the backup during backup access services. The offset may be derived from the backup itself or from the file system metadata (e.g., the parent file identifiers and the size or lengths of each file). The offset may include other and/or additional information without departing from embodiments disclosed herein.

In one or more embodiments, data block extents may refer to one or more data structures that specify where a data block and/or portions of data blocks of a block-based backup and file begin and end in the storage of the host and/or the backup storage. The data block extents may be obtained by the data protection agent based on the updated file system metadata and/or the backup. The data block extents may be pointers that reference locations in a backup storage where a data block or portion of a data block of a backup begins and ends. The data block extents may be used to identify and obtain specific data blocks of a block-based backup. Each data block extent of the data block extents may be associated with a data block or a portion of a data block of a backup. Each data block extent may be mapped to, or otherwise associated with, a file identifier of a file in the file system. The data block extents may include other and/or additional information and may be used for other and/or additional purposes without departing from embodiments disclosed herein.

The data protection agent may also include backup information in the incremental backup metadata which may include an assigned backup identifier associated with the backup, a creation timestamp associated with the backup, backup type (e.g., full image backup or incremental image backup), and the targeted backup storage for the backup (e.g., as specified by the backup request obtained from the data protection manager). If more than one backup storage is used to store portions of the backup, the incremental backup metadata file may be updated to include multiple instances of backup information associated with each backup storage. The incremental backup metadata may be written to the backup storage and included with the incremental image backup. The incremental backup metadata may be generated based on the updated file system metadata and the backup and a copy of the incremental backup metadata may be stored with the file data to generate the incremental image backup via other and/or additional methods without departing from embodiments disclosed herein.

In Step 634, the incremental backup metadata and a copy of the backup is provided to indexing engine for indexing. In one or more embodiments, the data protection agent sends the incremental backup metadata and a copy of the backup to the indexing engines (not shown in FIGS. 1A-1C). As discussed above, the indexing engines may be included in or otherwise operatively connected to the data protection manager. As also discussed above, the indexing engines may be computer instructions, which when executed by a processor (e.g., of the data protection manager or another entity), may perform indexing on backups using the incremental backup metadata. Indexing may refer to parsing backups and classifying backup contents for quickly identifying and obtaining specific portions of backups. The indexing engine may specifically use the status indicators of the incremental backup metadata to parse and classify new and modified files only, and not have fully parse the entirety of the incremental backup and the previous full backup to determine which files have been changed, modified, deleted, or unmodified, greatly reducing the load on the indexing engines. In response to obtaining the incremental backup metadata and the backup, the indexing engines perform indexing on the incremental backup using the incremental backup metadata. The incremental backup metadata and a copy of the incremental backup may be sent to the indexing engines via other and/or additional methods without departing from embodiments disclosed herein.

In one or more embodiments disclosed herein, the method ends following Step 634.

Figure 7:
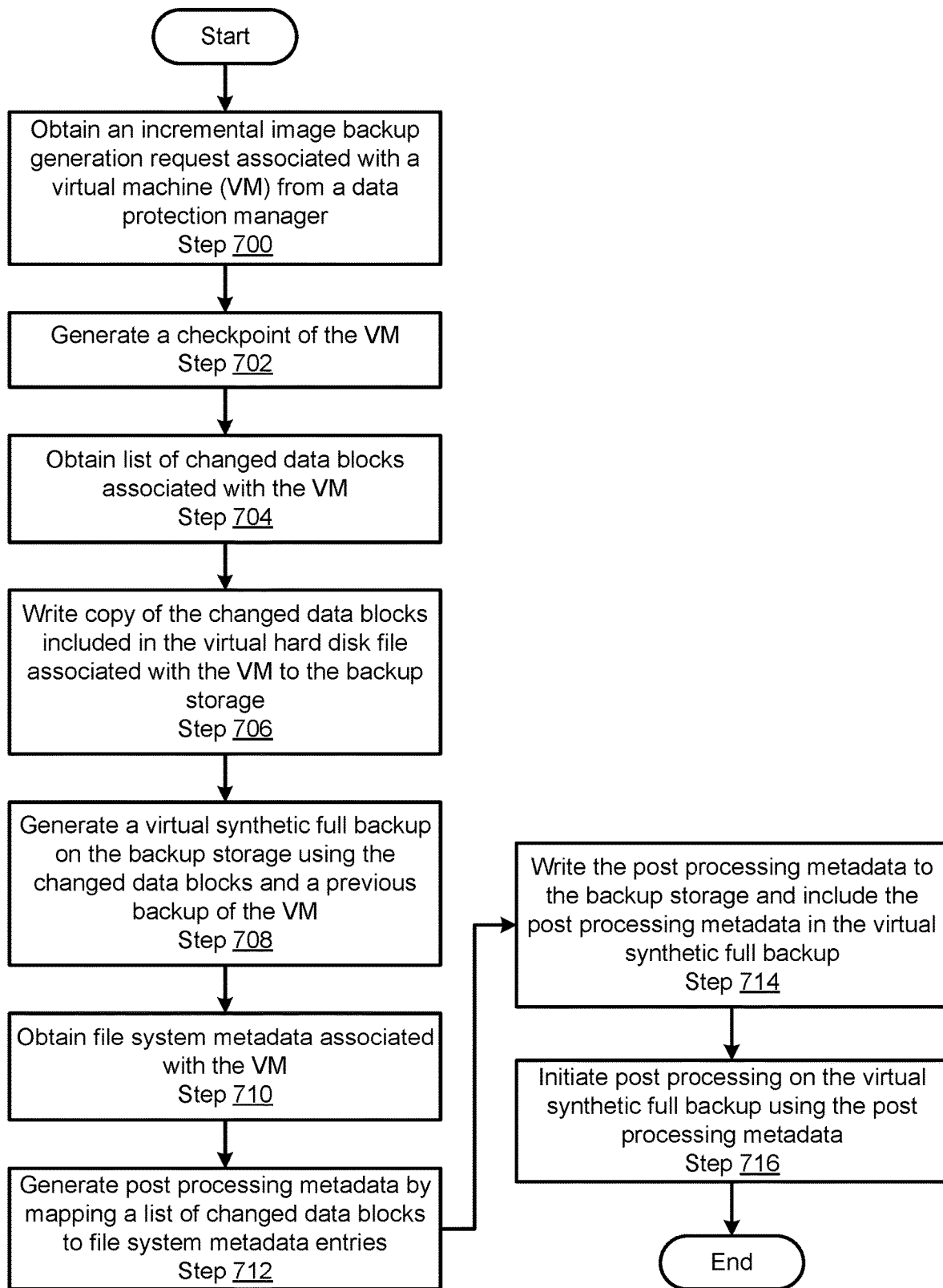
FIG. 7 shows a flowchart of a method for performing a virtual full synthetic backup with post processing in accordance with one or more embodiments disclosed herein.

FIG. 7 shows a flowchart of a method for performing an virtual synthetic full backup with post processing in accordance with one or more embodiments disclosed herein. The method shown in FIG. 7 may be performed by, for example, a data protection agent (e.g., 106, FIG. 1B). Other components of the system in FIGS. 1A-1C may perform all, or a portion, of the method of FIG. 7 without departing from the scope of the embodiments described herein. While FIG. 7 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 700, obtain an incremental image backup generation request associated with a virtual machine (VM) from a data protection manager. In one or more embodiments, the data protection agent may obtain a request to generate an incremental image backup from the data protection manager associated with the VM. The data protection agent may identify the receipt of the request as the backup generation event. The request may include the VM identifier associated with the VM targeted by the request. In one or more embodiments, the request may include a backup storage information associated with one or more backup storages in which the to-be generated backup is to be stored. The backup storage information may include the backup storage identifier, a backup storage type, and/or connection information (e.g., network address, IP address, etc.). The request may include other and/or additional information associated with backup generation without departing from embodiments disclosed herein. In one or more embodiments, the data protection manager may send the request based on a protection policy associated with an application or the file system. The protection policy may be a data structure that specifies backup requirements (e.g., a backup schedule specifying points in time to generate backups, backup storage information associated with one or more backup storages to store the backup and/or portions of the backup, etc.). The protection policies may be generated by users and provided to the data protection manager, which may monitor the protection policies to initiate the performance of data protection services according to the backup requirements specified by the protection policy.

In another embodiment, the data protection manager may send the backup generation request in response to an on-demand backup generation request submitted by a user of the system. The user may submit the on-demand backup generation request through any type of user interface (e.g., graphical user interface) without departing from embodiments disclosed herein. The on-demand backup generation request may include backup storage information associated with one or more backup storages to store the backup and/or portions of the backup and/or other information associated with the backup generation without departing from embodiments disclosed herein.

The incremental image backup generation request associated with the VM may be obtained from a data protection manager via other and/or additional methods without departing from embodiments disclosed herein.

In Step 702, a checkpoint of the VM is generated. In one or more embodiments, the data protection agent may generate or initiate generation of a checkpoint of the VM associated with the image backup. In one or more embodiments, a VM checkpoint may refer to a differencing file or snapshot that captures the state, data, and/or hardware configuration of a VM in operation. The checkpoint may insure that the image of the VM is good and will not change during the generation of the backup. The checkpoint of the VM may be generated via other and/or additional methods without departing from embodiments disclosed herein.

In Step 704, a list of changed data blocks associated with the VM is obtained. In one or more embodiments, the data protection agent may obtain the changed blocks associated with the VM using Change Block Tracking (CBT) service (e.g., computer instructions), which when executed by a processor of the host monitor data blocks of VMs over time. The data protection agent may request and obtain the changed blocks that have changed since the previous backup of the VM was generated from the CBT service. Other block monitoring services may be used (e.g., Resilient Change Tracking (RCT)) without departing from embodiments disclosed herein. The changed blocks associated with the VM may be obtained via other and/or additional methods without departing from embodiments disclosed herein.

In Step 706, a copy of the changed data blocks included in the virtual hard disk associated with the VM are written to the backup storage. In one or more embodiments, the data protection agent may then write the one or more data blocks associated with the changed blocks to the backup storage to generate an incremental image backup. As a result, the changed files of the VM may be included in the backup. The file data included in the virtual hard disk file associated with the VM may be written to the backup storage via other and/or additional methods without departing from embodiments disclosed herein.

In Step 708, a virtual synthetic full backup on backup storage is generated using the changed data blocks and a previous backup of the VM. In one or more embodiments, the data protection agent may send a request to the backup storage to generate virtual synthetic full backup. In response to obtaining the request, the backup storage may merge the changed data blocks of the incremental image backup with a previous backup of the VM (either a previous full backup or a previous virtual synthetic full backup) to generate the virtual synthetic full backup. The virtual synthetic full backup may be generated on the backup storage using the changed data blocks and a previous backup of the VM via other and/or additional methods without departing from embodiments disclosed herein.

In Step 710, file system metadata associated with the VM is obtained. As discussed above, the storage of the host may include file system metadata repository that stores information associated with files of VMs included in the file system of the host generated by user and/or VMs of the host during the performance of computer implemented services. The data protection agent may obtain file system metadata associated with the VM from the file system metadata repository. The data protection agent may use the VM identifier to obtain file system metadata associated with the VM. The data protection agent may use other appropriate methods, frameworks, or techniques to obtain file system metadata and other information regarding applications of the host (e.g., a Volume Shadow Copy Service (VSS)). The file system metadata associated with the application may be obtained via other and/or additional methods without departing from embodiments disclosed herein.

In Step 712, post processing metadata is generated by mapping a list of changed data blocks to file system metadata entries. As discussed above, the file system metadata may include entries associated with each file that include file identifiers associated with the file, the file length or size, one or more data runs associated with one or more data blocks of the file, data block identifiers associated with the one or more data blocks of the file, the creation date, the modification date, the application identifier associated with the file, and a parent file or folder associated with the file. Additionally, the list of changed data blocks (i.e., the data block identifiers associated with changed data blocks) may not include data runs or other storage locations associated with the data blocks included in the changed data blocks. Accordingly, the data protection agent may map the file system metadata entries of each file with the changed data block to generate post processing metadata. Therefore, each changed data block included in the incremental image backup and the corresponding virtual full synthetic backup may be located using the file system metadata entry mapped to it in the post processing metadata. Post processing metadata may be generated by mapping a list of changed data blocks to file system metadata entries via other and/or additional methods without departing from embodiments disclosed herein.

In Step 714, the post processing metadata is written to the backup storage and included in the virtual synthetic full backup. In one or more embodiments, the data protection agent may then write the post processing metadata to the backup storage to include the post processing metadata with the virtual synthetic full backup associated with the post processing metadata. As a result, the post processing metadata may be used to perform post processing on the changed data blocks included in the virtual synthetic full backup. The post processing metadata may be written to the backup storage and included in the virtual synthetic full backup via other and/or additional methods without departing from embodiments disclosed herein.

In Step 716, post processing on the virtual synthetic full backup using the post processing metadata is initiated. In one or more embodiments, post processing engines may be included in or otherwise operatively connected to the backup storage. The post processing engines may be computer instructions, which when executed by a processor (e.g., of the backup storage or another entity), may perform data analytics operations or other post processing operation on virtual synthetic full backups when such backups are stored in the backup storage using the post processing metadata. The data analytics operations may include authentication, security threat detection, anomaly detection, and other and/or additional machine learning or artificial intelligence operations without departing from embodiments disclosed herein. The post processing engine may specifically use the post processing metadata to provide context for where the changed data blocks are located in the backup storage, which files they belong to, and other insights required to perform the post processing. The virtual synthetic full backup may not be able to handle the changed blocks without these insights provided by the post processing metadata. Post processing on the virtual synthetic full backup may be initiated using the post processing metadata via other and/or additional methods without departing from embodiments disclosed herein.

In one or more embodiments disclosed herein, the method ends following Step 716.

Figure 8:
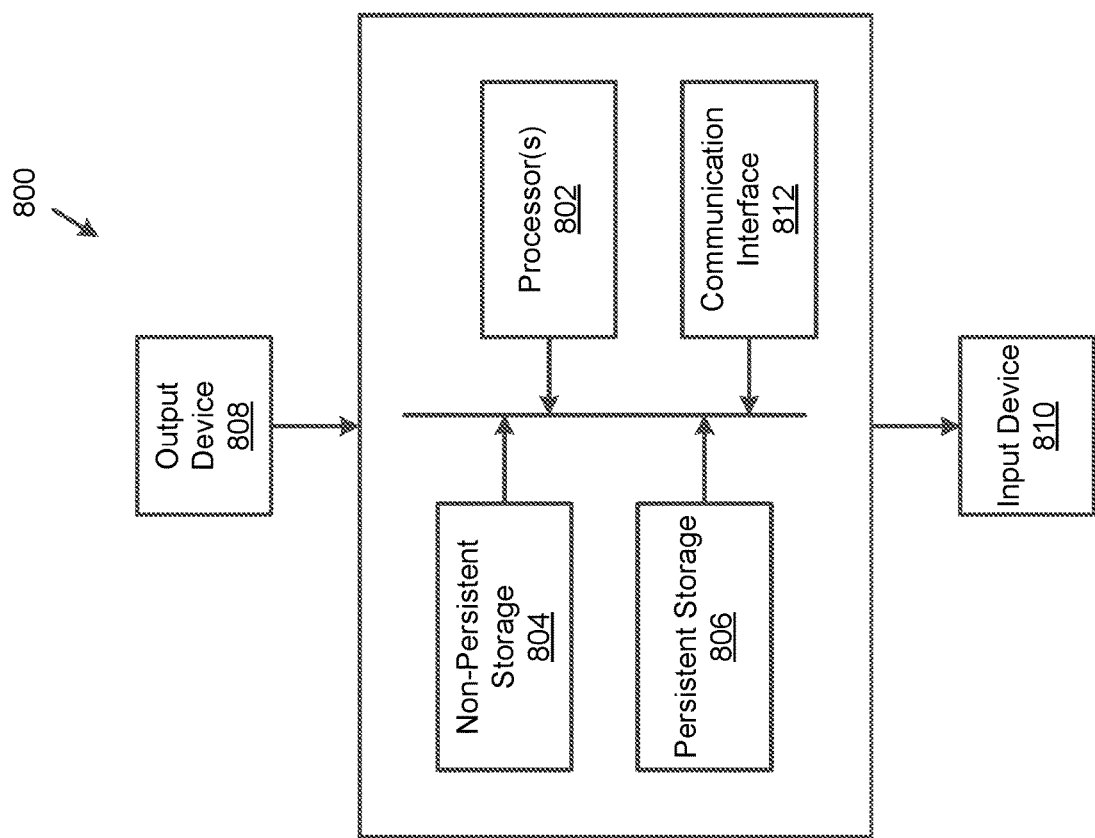
FIG. 8 shows a diagram of a computing device in accordance with one or more embodiments disclosed herein.

As discussed above, embodiments of the invention may be implemented using computing devices. FIG. 8 shows a diagram of a computing device in accordance with one or more embodiments of the invention. The computing device (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing device (800) may also include one or more input devices (810), such as a touchscreen, keyboard, mouse, microphone, touchpad, electronic pen, or any other type of input device. Further, the communication interface (812) may include an integrated circuit for connecting the computing device (800) to a network (not shown) (e.g., a local area network (LAN), a wide area network (WAN) such as the Internet, mobile network, or any other type of network) and/or to another device, such as another computing device.

In one embodiment of the invention, the computing device (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing devices exist, and the aforementioned input and output device(s) may take other forms.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

As used herein, an entity that is programmed to, or configured to, perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for performing restorations of file system data on a host, comprising:
 identifying, by a data protection agent of a host, a restoration event associated with a file system of the host;
 in response to identifying the restoration event:
  obtaining backup metadata associated with a backup of the file system, wherein the backup metadata comprises previously generated checksums of the files included in the file system at a time the backup was generated;
  obtaining current file system metadata associated with the file system from a file system metadata repository on a storage of the host;
  generating current checksums of the files of the file system using the current file system metadata;
  identifying non-matching files and matching files using the previously generated checksums and the current checksums;
  storing local copies of the matching files on the host to restore the matching files;
  obtaining current data runs associated with the non-matching files from the current file system metadata;
  obtaining backup data runs associated with the non-matching files from the backup metadata;
  identifying, based on the current data runs and the backup data runs, matching portions of the non-matching files, non-matching portions of the non-matching files, and completely unique files of the non-matching files;
  storing local copies of the matching portions of the non-matching files on the host to restore the matching portions of the non-matching files; and
  restoring the completely unique files of the non-matching files and the non-matching portions of the non-matching files from a backup storage that includes the backup.

2. The method of claim 1, wherein identifying the non-matching files and the matching files comprises:
selecting a first file of the files;
in response to selecting the first file:
comparing a first previously generated checksum of the previously generated checksums corresponding to the first file with a first current checksum of the current checksums corresponding to the first file; and
making a first determination that the first previously generated checksum does not match the first current checksum;
making, in response to the first determination, a second determination that the non-matching files comprise the first file; and
selecting a second file of the files.

3. The method of claim 2, the method further comprising:
in response to selecting the second file:
comparing a second previously generated checksum of the previously generated checksums corresponding to the second file with a second current checksum of the current checksums corresponding to the second file; and
making a third determination that the second previously generated checksum matches the second current checksum; and
making, in response to the third determination, a fourth determination that the matching files comprise the second file.

4. The method of claim 1, wherein:
a matching portion of the matching portions of the non-matching files comprises the same data block stored on the host as is included in the backup; and
a non-matching portion of the non-matching portions of the non-matching files comprises a different data block stored on the host as is included in the backup.

5. A method for performing restorations of file system data on a host, comprising:
identifying, by a data protection agent of a host, a restoration event associated with a file system of the host;
in response to identifying the restoration event:
obtaining backup metadata associated with a backup of the file system, wherein the backup metadata specifies data of files included in the file system at a time the backup was generated;
obtaining current file system metadata associated with the file system from a file system metadata repository on a storage of the host;
identifying non-matching files and matching files using the backup metadata and the current file system metadata;
storing local copies of the matching files on the host to restore the matching files;
identifying, based on the current file system metadata and the backup metadata, matching portions of the non-matching files, non-matching portions of the non-matching files, and completely unique files of the non-matching files;
storing local copies of the matching portions of the non-matching files on the host to restore the matching portions of the non-matching files; and
restoring the completely unique files of the non-matching files and the non-matching portions of the non-matching files from a backup storage that includes the backup.

6. The method of claim 5, wherein identifying the matching portions of comprises:
selecting a first file of the files;
in response to selecting the first file:
comparing a first previously generated checksum of previously generated checksums included in the backup metadata corresponding to the first file with a first current checksum of current checksums corresponding to the first file, wherein the current checksums are generated using the current file system metadata; and
making a first determination that the first previously generated checksum does not match the first current checksum;
making, in response to the first determination, a second determination that the non-matching files comprise the first file; and
selecting a second file of the files.

7. The method of claim 6, the method further comprising:
in response to selecting the second file:
comparing a second previously generated checksum of the previously generated checksums corresponding to the second file with a second current checksum of the current checksums corresponding to the second file; and
making a third determination that the second previously generated checksum matches the second current checksum; and
making, in response to the third determination, a fourth determination that the matching files comprise the second file.

8. The method of claim 6, wherein the first file comprises one selected from a group consisting of at least:
a modified file modified after a point in time the backup was generated;
a deleted file deleted after the point in time the backup was generated; and
a new file generated after the point in time the backup was generated.

9. The method of claim 8, wherein the second file comprises a file that has not been modified since the generation of the backup.

10. The method of claim 5, wherein storing the local copies of the matching files comprises performing a block cloning operation on the matching files.

11. The method of claim 5, wherein storing local copies of the matching portions of the non-matching files on the host comprises performing a block cloning operation on the matching portions of the non-matching files.

12. The method of claim 5, wherein:
a matching portion of the matching portions of the non-matching files comprises the same data block stored on the host as is included in the backup; and
a non-matching portion of the non-matching portions of the non-matching files comprises a different data block stored on the host as is included in the backup.

13. A non-transitory computer readable medium (CRM) comprising computer readable program code, which when executed by a computer processor enables the computer processor to perform a method for performing restorations of file system data on a host, comprising:
identifying, by a data protection agent of a host, a restoration event associated with a file system of the host;
in response to identifying the restoration event:
obtaining backup metadata associated with a backup of the file system, wherein the backup metadata specifies data of files included in the file system at a time the backup was generated;

obtaining current file system metadata associated with the file system from a file system metadata repository on a storage of the host;

identifying non-matching files and matching files using the backup metadata and the current file system metadata;

storing local copies of the matching files on the host to restore the matching files;

identifying, based on the current file system metadata and the backup metadata, matching portions of the non-matching files, non-matching portions of the non-matching files, and completely unique files of the non-matching files;

storing local copies of the matching portions of the non-matching files on the host to restore the matching portions of the non-matching files; and restoring the completely unique files of the non-matching files and the non-matching portions of the non-matching files from a backup storage that includes the backup.

14. The CRM of claim 13, wherein identifying, based on the current file system metadata and the backup metadata, matching portions of the non-matching files, non-matching portions of the non-matching files, and completely unique files of the non-matching files comprises:

obtaining current data runs associated with the non-matching files from the current file system metadata;

obtaining backup data runs associated with the non-matching files from the backup metadata; and identifying, based on the current data runs and the backup data runs, matching portions of the non-matching files, non-matching portions of the non-matching files, and completely unique files of the non-matching files.

15. The CRM of claim 14, wherein:

a matching portion of the matching portions of the non-matching files comprises the same data block stored on the host as is included in the backup; and a non-matching portion of the non-matching portions of the non-matching files comprises a different data block stored on the host as is included in the backup.

16. The CRM of claim 14, wherein:

a current data run of the current data runs specifies an offset and a length of a data block of a file of the files currently stored in a storage volume associated with the file system; and a backup data run of the backup data runs specifies an offset and a length of the file that was stored in a storage volume associated with the file system at a point in time the backup was generated.

17. The CRM of claim 13, wherein storing the local copies of the matching files comprises performing a block cloning operation on the matching files.

18. The CRM of claim 13, wherein storing local copies of the matching portions of the non-matching files on the host comprises performing a block cloning operation on the matching portions of the non-matching files.

19. The CRM of claim 13, wherein identifying the non-matching files and the matching files comprises:

selecting a first file of the files;

in response to selecting the first file:
making a first determination that a first portion of the backup metadata corresponding to the first file and a first portion of the current file system metadata corresponding to the first file do not match;
making, in response to the first determination, a second determination that the non-matching files comprise the first file; and selecting a second file of the files.

20. The CRM of claim 19, the method further comprising:

in response to selecting the second file:
making a third determination that a second portion of the backup metadata corresponding to the second file and a second portion of the current file system metadata corresponding to the second file match; and
making, in response to the third determination, a fourth determination that the matching files comprise the second file.

* * * * *